(12) United States Patent
Katardjiev et al.

(10) Patent No.: US 11,878,713 B2
(45) Date of Patent: *Jan. 23, 2024

(54) DRIVING ASSISTANCE SYSTEM AND METHOD

(71) Applicant: TELEFONAKTIEBOLAGET LM ERICSSON (PUBL), Stockholm (SE)

(72) Inventors: Vladimir Katardjiev, Santa Clara, CA (US); Julien Forgeat, San Jose, CA (US); Meral Shirazipour, Santa Clara, CA (US); Dmitri Krylov, Santa Clara, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,316

(22) Filed: Apr. 25, 2022

(65) Prior Publication Data
US 2022/0250650 A1 Aug. 11, 2022

Related U.S. Application Data

(63) Continuation of application No. 16/648,022, filed as application No. PCT/IB2018/057185 on Sep. 18, 2018, now Pat. No. 11,312,392.
(Continued)

(51) Int. Cl.
*B60W 60/00* (2020.01)
*B60W 10/20* (2006.01)
(Continued)

(52) U.S. Cl.
CPC ........ *B60W 60/0011* (2020.02); *B60W 10/20* (2013.01); *B60W 40/06* (2013.01);
(Continued)

(58) Field of Classification Search
CPC .................................................. B60W 60/0011
See application file for complete search history.

(56) References Cited

U.S. PATENT DOCUMENTS 6,535,118 B1    3/2003  Takagi et al.
7,616,642 B2 *  11/2009 Anke ...................... H04W 8/04
                                                    370/395.42
(Continued)

FOREIGN PATENT DOCUMENTS

WO   WO2017123232 A1   7/2017
WO   WO2017123233 A1   7/2017
(Continued)

OTHER PUBLICATIONS

Sayers, Michael et al., "The International Road Roughness Experiment". Establishing Correlation and a Calibration Standard for Measurements, Copyright 1986, Technical Paper No. 45, The World Bank, Washington D.C., Part 1, pp. 1-90.
(Continued)

*Primary Examiner* — Michael A Berns
(74) *Attorney, Agent, or Firm* — The Danamraj Law Group, P.C.

(57) ABSTRACT

A system, method and architecture for providing driving recommendations to a vehicle based on network-assisted scanning of a surrounding environment. In one embodiment, the system is operative for receiving environmental data from one or more collection agents, each operating with a plurality of sensors configured to sense data relating to the environment. At least one collection agent is operative in association with the vehicle for providing vehicular condition data and vehicular navigation data. Road condition information and obstacle condition information relating to a road segment, the vehicle is traversing may be obtained. Responsive to the road condition/navigation data, vehicle type and positioning, etc., a routing path over the road
(Continued)

segment may be determined. In one configuration, the routing path may be presented via a display (e.g., AR/MR) associated with the vehicle.

25 Claims, 23 Drawing Sheets

Related U.S. Application Data

(60) Provisional application No. 62/559,761, filed on Sep. 18, 2017.

(51) Int. Cl.
*B60W 40/06* (2012.01)
*B60W 50/14* (2020.01)
*G06V 20/58* (2022.01)

(52) U.S. Cl.
CPC ............ *B60W 50/14* (2013.01); *G06V 20/58* (2022.01); *B60W 2050/146* (2013.01); *B60W 2556/10* (2020.02); *B60W 2556/40* (2020.02); *B60W 2556/50* (2020.02)

(56) References Cited

U.S. PATENT DOCUMENTS

| | | | |
|---|---|---|---|
| 8,565,109 | B1 | 10/2013 | Poovendran et al. |
| 8,762,035 | B2 | 6/2014 | Levine et al. |
| 8,818,708 | B2 | 8/2014 | Mathieu |
| 8,880,273 | B1 | 11/2014 | Ferguson et al. |
| 9,109,913 | B2 | 8/2015 | Lu et al. |
| 9,167,501 | B2 | 10/2015 | Kempf |
| 9,212,926 | B2 | 12/2015 | Attard |
| 9,448,073 | B2 | 9/2016 | Stracke |
| 9,628,565 | B2 | 4/2017 | Stenneth et al. |
| 9,645,577 | B1 | 5/2017 | Frazzoli et al. |
| 9,843,647 | B2 | 12/2017 | Stenneth |
| 9,929,905 | B2 | 3/2018 | Asenjo |
| 9,983,093 | B2 | 5/2018 | Allen |
| 10,176,596 | B1 | 1/2019 | Mou |
| 10,474,147 | B2 | 11/2019 | Park |
| 10,629,080 | B2 | 4/2020 | Kazemi |
| 10,677,879 | B2 * | 6/2020 | Steinhour .................. G06T 7/73 |
| 10,889,294 | B2 | 1/2021 | Schein |
| 11,026,293 | B2 * | 6/2021 | Sullivan ................ H04W 84/06 |
| 11,071,912 | B2 | 7/2021 | Silverstein |
| 11,312,392 | B2 * | 4/2022 | Katardjiev ............. G06V 20/58 |
| 11,417,106 | B1 * | 8/2022 | Alzahrani ............... G06T 13/40 |
| 11,551,456 | B2 * | 1/2023 | Lei .......................... G07C 5/008 |
| 2006/0264221 | A1 | 11/2006 | Koike et al. |
| 2007/0153802 | A1 | 7/2007 | Anke et al. |
| 2007/0294023 | A1 | 12/2007 | Arcot et al. |
| 2014/0241247 | A1 | 8/2014 | Kempf et al. |
| 2014/0330526 | A1 | 11/2014 | Allen |
| 2015/0149088 | A1 | 5/2015 | Attard et al. |
| 2015/0244826 | A1 | 8/2015 | Stenneth |
| 2015/0269840 | A1 | 9/2015 | Hirata |
| 2016/0102987 | A1 | 4/2016 | Ding et al. |
| 2017/0214575 | A1 | 7/2017 | Asenjo et al. |
| 2018/0205658 | A1 | 7/2018 | Sullivan |
| 2018/0316764 | A1 | 11/2018 | Ferreira Gomes et al. |
| 2018/0370532 | A1 | 12/2018 | Schein et al. |
| 2019/0066506 | A1 | 2/2019 | Kazemi et al. |
| 2020/0255026 | A1 | 8/2020 | Katardjiev |
| 2022/0250650 | A1 * | 8/2022 | Katardjiev ............ B60W 40/12 |

FOREIGN PATENT DOCUMENTS

| | | |
|---|---|---|
| WO | WO2018220576 A1 | 12/2018 |
| WO | WO2019053524 A1 | 3/2019 |
| WO | WO2019083695 A1 | 3/2019 |

OTHER PUBLICATIONS

Sayers, Michael et al., "The International Road Roughness Experiment", Establishing Correlation and a Calibration Standard for Measurements, Copyright 1986, Technical Paper No. 45, The World Bank, Washington D.C., Part 2, pp. 100-199.

Sayers, Michael et al., "The International Road Roughness Experiment". Establishing Correlation and a Calibration Standard for Measurements, Copyright 1986, Technical Paper No. 45, The World Bank, Washington D.C., Part 3, pp. 200-299.

Sayers, Michael et al., "The International Road Roughness Experiment", Establishing Correlation and a Calibration Standard for Measurements, Copyright 1986, Technical Paper No. 45, The World Bank, Washington D.C., Part 4, pp. 300-399.

Sayers, Michael et al., "The International Road Roughness Experiment", Establishing Correlation and a Calibration Standard for Measurements, Copyright 1986, Technical Paper No. 45. The World Bank, Washington D.C., Part 5, pp. 400-466.

ISA/EPO, International Search Report and Written Opinion of the International Searching Authority, International Application No. PCT/IB2018/055521, dated Oct. 30, 2018, 12 pgs.

ISA/EPO, International Search Report and Written Opinion of the International Searching Authority, International Application No. PCT/IB2018/057185, dated Jan. 18, 2019, 13 pgs.

Ellis, "Research group says poor roads cost Oklahoma motorists $5 billion a year", News OK, May 11, 2017, 4 pgs.

European Commission, "Quality of Roads", Mobility and Transport. Updated Aug. 24, 2017, 1 pg.

Fiegerman, "The billion dollar war over maps", CNN, Jun. 7, 2017. 5 pgs.

Griffith, "Meet Carmera, a Startup Using Delivery Fleets to Create 3D Maps of Cities", Fortune.com. Jun. 5, 2017, 3 pgs.

Heggie, Ian et al., "The Impact of Poor Road Maintainance", Commercial Management and Financing of Roads, Copyright 1998. Technical Paper 409, World Bank, Washington, DC.

Korosec, "This startup is using Uber and Lyft drivers to bring self-driving cars to market faster". The Verge, Jul. 19, 2017, 8 pgs.

Nvidia, "End-to-end HD mapping for self-driving cars". NVIDIA. com. Copyright 2017, 2 pgs.

Smolens, "Study: Bad roads cost you $1,900 a year", The San Diego Union-Tribune, Aug. 17, 2016, 2 pgs.

Trip, "Bumpy Roads Ahead: America's Roughest Rides and Strategies to make our Roads Smoother", tripnet.org, Nov. 2016, 34 pgs.

World Economic Forum, "Global Competitiveness Rankings", reports. weforum.com, 2014-2015, 6 pgs.

USPTO, Office Action, U.S. Appl. No. 16/647,667, dated Oct. 28, 2021, 17 pgs.

EPO, Communication Pursuant to Article 94(3), Application No. 18 762 919.1-1213, Oct. 20, 2021, 8 pgs.

3GPP Draft, "5G Automotive Vision", 3rd Generation Partnership Project (3GPP), Nov. 30, 2015, 67 pgs.

USPTO, Office Action, U.S. Appl. No. 16/647,667, dated May 4, 2022, 20 pgs.

USPTO, Notice of Allowance, U.S. Appl. No. 16/647,667, dated Aug. 15, 2022, 9 pgs.

* cited by examiner

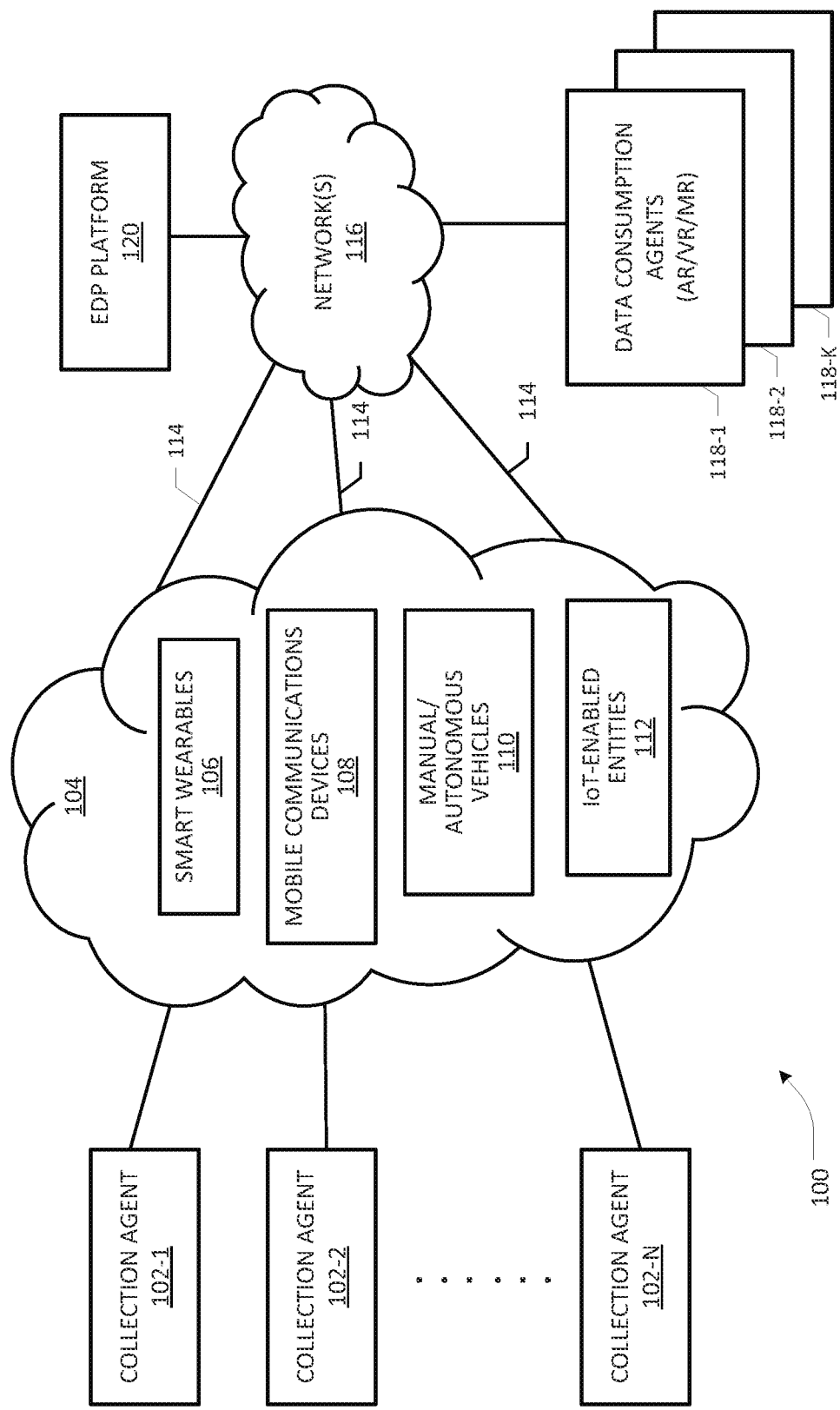

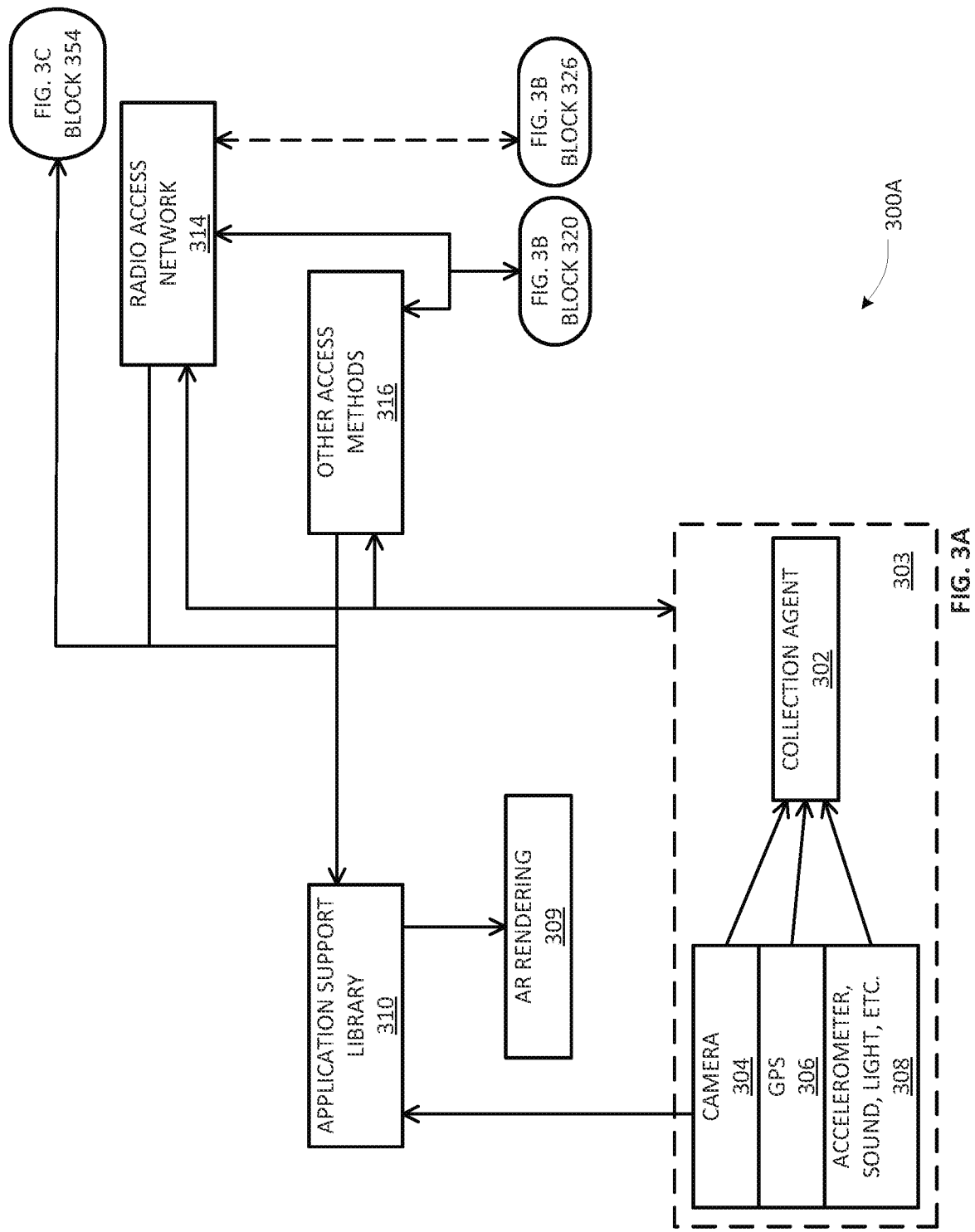

DRIVING ASSISTANCE SYSTEM AND METHOD

PRIORITY AND CROSS-REFERENCE TO RELATED APPLICATIONS

This application is a continuation of U.S. patent application Ser. No. 16/648,022, which is a 35 U.S.C. § 371 National Stage filing of PCT/IB2018/057185, filed Sep. 18, 2018, which in turn claims the benefit of the following prior United States provisional patent application(s): (i) "SYSTEM AND METHOD FOR PROVIDING PRECISE DRIVING RECOMMENDATIONS BASED ON NETWORK-ASSISTED SCANNING OF A SURROUNDING ENVIRONMENT," Application No. 62/559,761, filed Sep. 18, 2017; each of which is hereby incorporated by reference in its entirety.

TECHNICAL FIELD

The present disclosure generally relates to communication networks configured for facilitating network-assisted scanning of surrounding environments to obtain high fidelity geospatial mapping information and using the same in a vehicular augmented/mixed reality (AR/MR) environment.

BACKGROUND

Increasingly, augmented and virtual reality (AR/VR) are becoming more than gaming environments, with companies finding enterprise potential in the technology in a host of applications. One of the goals of the industry is to replace conventional user interfaces such as keyboards, displays, etc. with new paradigms for human-machine communication and collaboration, thereby facilitate a major shift in user engagement in AR/VR environments. Accordingly, the enterprise potential of AR/VR technology continues to grow as companies are constantly exploring new use cases beyond pilot or "one-off" applications.

Mixed reality (MR) represents a further advance where both AR and real world environments may be merged in additional enhancements to provide richer user experiences. As the trends in AR/VR/MR deployment continue to grow apace, interest in providing enhanced presentation of various types of data, e.g., vehicular navigation data, etc., by way of digital "real estate" in AR/VR/MR environments has also grown concomitantly, albeit potentially within the constraints of efficient bandwidth utilization and optimization in an AR-supported network. Relatedly, whereas there have been several advances in the field of autonomous vehicles and navigation systems, significant lacunae continue to exist, as will be set forth hereinbelow.

SUMMARY

The present patent disclosure is broadly directed to systems, methods, apparatuses, devices, and associated non-transitory computer-readable media and network architecture for facilitating network-assisted scanning of surrounding environments by efficient use of radio network capacity. In one aspect, an example method includes, inter alia, collecting environmental data by a collection agent operating with a plurality of sensors configured to sense data relating to a surrounding environment and prioritizing the environmental data responsive to at least one of a determination of cellular radio access network (RAN) resource capacity available to the collection agent, including but not limited to: compute resources, storage resources, radio transmission resources, cost of the cellular RAN resource capacity available to the collection agent, and/or relative urgency/relevance of an event within the environment to which at least a portion of the environmental data pertains, among others. Responsive to prioritizing the environmental data, one or more pieces of the environmental data may be transmitted to a nearest edge compute location (e.g., at an edge network node associated with a cellular network) and/or a cloud-based datacenter network node. Where cellular connectivity is insufficient, other modes of connectivity (e.g., WiFi) may be applied.

In another aspect, the present patent application is also directed to systems, methods, apparatuses, devices, and associated non-transitory computer-readable media and network architecture for facilitating usage of detailed road data with respect to providing precise driving recommendations in a vehicular use case scenario involving manual and/or autonomous control. An example method for facilitating highly assisted driving (HAD) in a vehicle based on geospatial sensing of an environment in which the vehicle is disposed comprises, inter alia, receiving environmental data from one or more collection agents, each operating with a plurality of sensors configured to sense data relating to the environment, wherein at least one collection agent is operative in association with the vehicle for providing vehicular condition data and vehicular navigation data. Responsive to the vehicular condition/navigation data, the vehicle positioning and vehicle type may be calibrated. Road condition information and/or obstacle condition information relating to a road segment the vehicle is traversing may also be obtained. A suitable racing line path over the road segment is determined, e.g., responsive to optimizing comfort and safety in view of road conditions and given vehicle type, direction, speed, etc. In one variation, the optimal racing line path may be presented via a display, e.g., an AR/MR display, associated with the vehicle.

In a further aspect, an embodiment of a system, apparatus, or network platform is disclosed which comprises, inter alia, suitable hardware such as processors and persistent memory having program instructions for executing an embodiment of the methods set forth herein. In another aspect, an embodiment of a user equipment (UE) device having a collection agent configured to sense and report environmental sensory data with respect to an ambient environment is disclosed.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, apparatus, system, network element, subscriber device, and the like, mutatis mutandis. Further features of the various embodiments are as claimed in the dependent claims.

Benefits flowing from an embodiment of the present invention may include but not limited to one or more of the following: localized processing/encoding to ease the burden on network bandwidth; data retrieval scheduling with suitable prioritization, e.g., policy-based, operator-configured, etc., for throttling bandwidth usage; lower cost updates to high fidelity mapping databases, resulting in increased spatial resolution in an economical way; and providing a scalable crowd-sourcing architecture for efficient sensory data collection as the number of consumers, sensing points, vehicles, connectivity options, and the like continue to grow.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 1 depicts an example architecture for facilitating network-assisted environmental scanning for purposes of one or more embodiments of the present invention;

FIGS. 3A-3C depict a functional block diagram illustrative of various components, blocks, modules network elements and/or apparatuses that may be combined into an example implementation of the network architecture of FIG. 1 according to one embodiment;

FIGS. 14A-1 to 14A-3, 14B and 14C are flowcharts of various blocks, steps and/or acts that may be (re)combined in one or more arrangements, with or without additional flowcharts of the present disclosure, for facilitating highly assisted driving using the system of FIGS. 13A-13B;

DETAILED DESCRIPTION

Figure 2A:
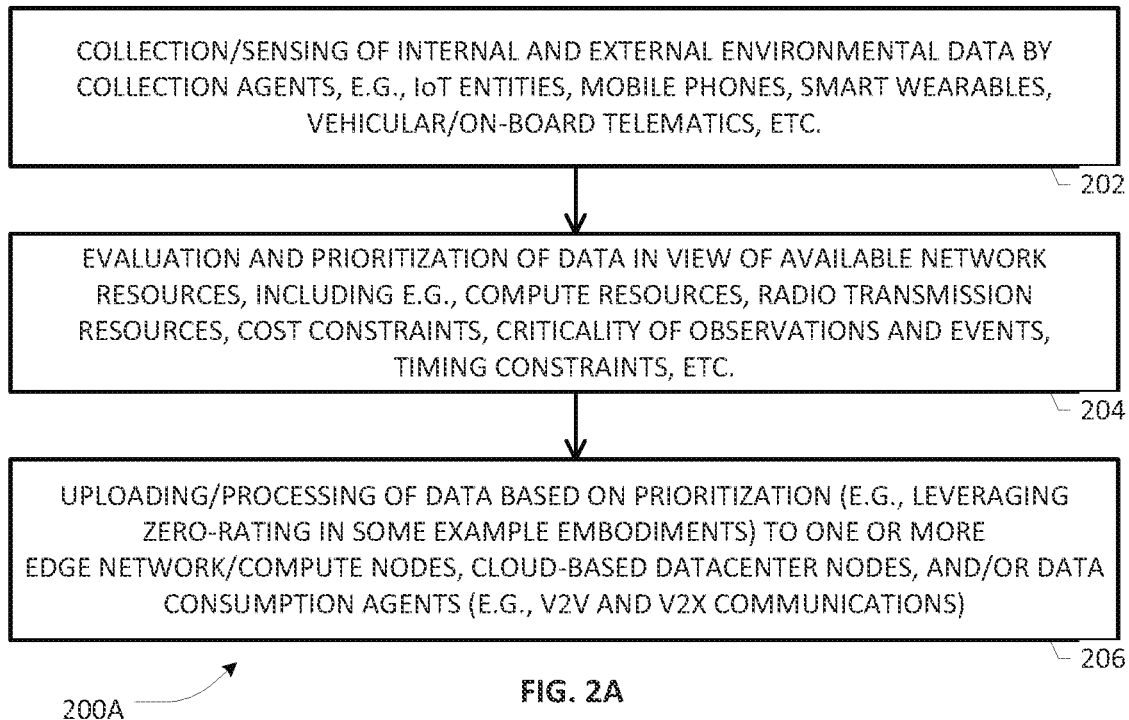
FIGS. 2A and 2B are flowcharts of various blocks, steps and/or acts that may be (re)combined in one or more arrangements, with or without additional flowcharts of the present disclosure, for facilitating environmental and ambient sensory recognition according to one or more embodiments of the present patent application.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

As used herein, a network element, platform or node may be comprised of one or more pieces of service network equipment, including hardware and software that communicatively interconnects other equipment on a network (e.g., other network elements, end stations, etc.), and is adapted to host one or more applications or services with respect to a plurality of subscribers and associated client devices as well as other endpoints and Internet-of-Things (IoT)-based entities, each executing suitable client applications configured to sense/collect various types of data, information, measurements, etc. for facilitating real-time or near real-time geospatial mapping or imaging of physical environments. As such, some network elements may be disposed in a cellular wireless or satellite telecommunications network, or a broadband wireline network, whereas other network elements may be disposed in a public packet-switched network infrastructure (e.g., the Internet or worldwide web, also sometimes referred to as the "cloud"), private packet-switched network infrastructures such as Intranets and enterprise networks, as well as service provider network infrastructures, any of which may span or involve a variety of access networks and core networks in a hierarchical arrangement. In still further arrangements, one or more network elements may be disposed in cloud-based platforms or datacenters having suitable equipment running virtualized functions or applications relative to various types of environmental data processing, geospatial imaging/mapping and rendering, which may include generation of AR/MR content, audio/video/graphics content, computer-generated imaging (CGI) content or holographic content, etc., suitable for presentation/display using a variety of technologies.

Example end stations, client devices or on-board monitoring units in vehicles (e.g., manual and/or autonomous vehicles) or any IoT-entity adapted to facilitate sensory data collection may comprise any device configured to execute, inter alia, real-time data collection in association with a variety of sensors and upload the data to a nearest edge node location e.g., via a suitable access network or edge network arrangement based on a variety of access technologies, standards and protocols, as will be described in detail below. Furthermore, an example client device may also cooperate with AR/MR devices including such as, e.g., a Google Glass device, Microsoft HoloLens device, etc., as well as holographic computing devices, which may or may not be deployed in association with additional local hardware such as networked or local gaming engines/consoles (such as Wii®, Play Station 3®, etc.), portable laptops, netbooks, palm tops, tablets, phablets, mobile phones, smartphones, multimedia/video phones, mobile/wireless user equipment, portable media players, smart wearables such as smart watches, goggles, digital gloves, and the like. Further, some client devices may also access or consume other content/services (e.g., non-AR/MR) provided over broadcast networks (e.g., cable and satellite networks) as well as a packet-switched wide area public network such as the Internet via suitable service provider access networks. In a still further variation, some client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Figures 1, 14A:
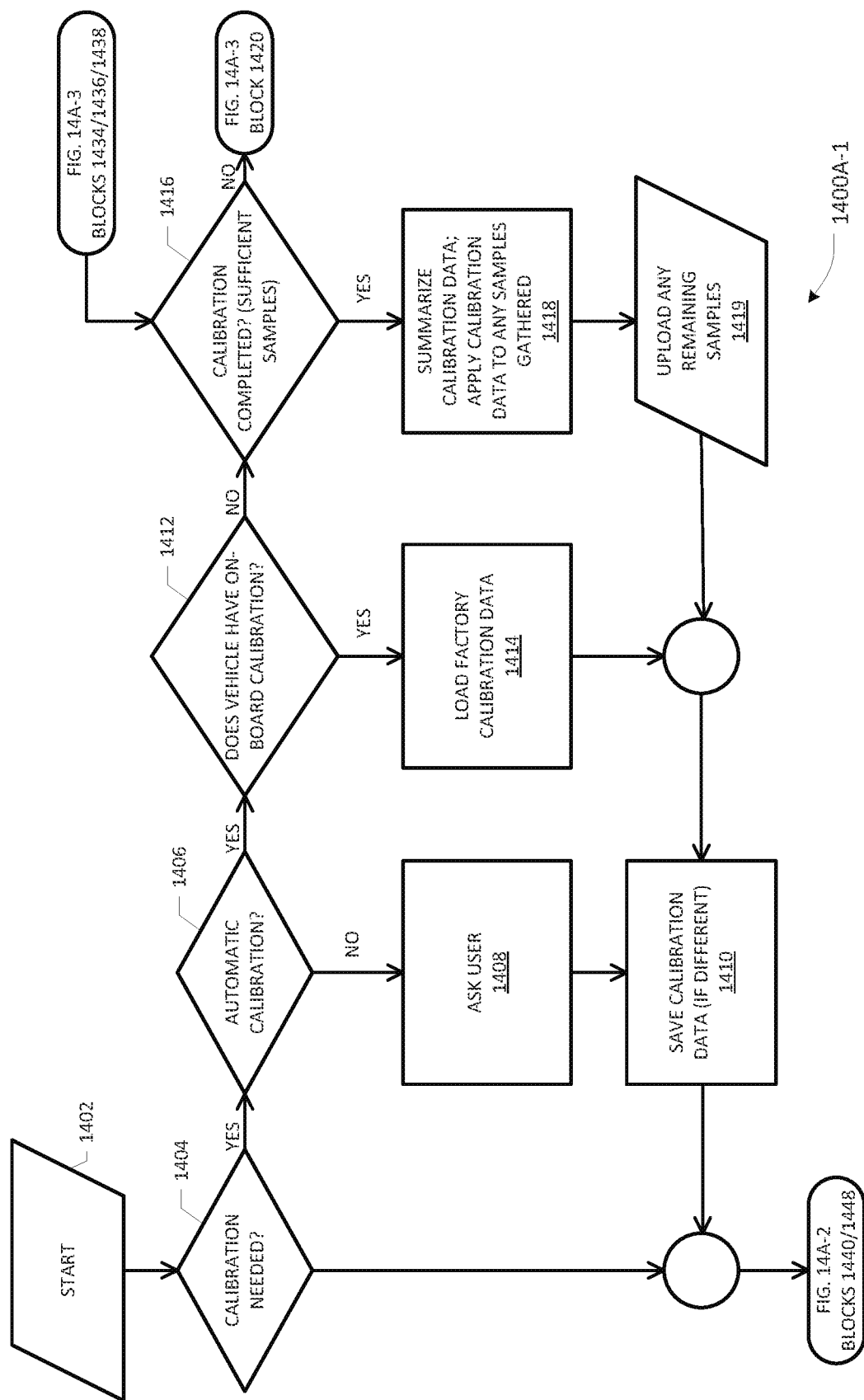

Referring now to the drawings and more particularly to FIG. 1, depicted therein is an example network environment 100 for facilitating network-assisted environmental scanning for purposes of one or more embodiments of the present invention. A plurality of collection agents (CAs) 102-1 to 102-N may be executed on or operative in association with various end stations, mobile communications devices, subscriber/user equipment (S/UE) including smart handheld devices such as tablets, phablets, gaming devices, location/navigation devices, smart wearable devices, manual/autonomous vehicles, as well as various Internet-of-Things (IoT)-enabled devices, appliances and entities, wherein suitable service logic of a collection agent may be configured to interoperate with one or more heterogeneous sensors for gathering environmental data with respect to respective physical surroundings, adjacent spaces and structures, and/or nearby vicinities using any known or heretofore unknown sensing technologies. By way of example, smart wearable devices 106 are representative of smart electronic devices that can be worn by humans as implants, fashion accessories, health/activity monitors, etc. Mobile communications devices 108 are exemplary of cell phones and/or smartphones that can interface with suitable RAN infrastructures using a variety of radio communications technologies. Manual/autonomous vehicles 110 may comprise any type of terrestrial vehicles (e.g., automobiles, vans, trucks, etc.) that may be driven in manual mode by humans or automatically by way of autonomous control (i.e., self-driving or driverless), or a combination thereof, which may include a vehicle control unit having an integrated collection agent functionality, or an on-board interface configured to communicate with an associated UE device having the collection agent functionality. Further, autonomous vehicles 110 may also include unmanned aerial vehicles (UAVs or drones), unmanned watercraft such as boats, submersibles, amphibious vehicles, etc. with appropriately configured collection agents executing thereon in an example embodiment of the present invention. IoT-enabled entities 112 may comprise smart appliances, smart buildings, and smart infrastructure components such as, e.g., smart traffic/road sensors and congestion monitors, traffic lights, lamp posts, street signposts, telephone posts, electric utility poles, and the like, each having a collection agent module operative with suitable sensors for facilitating high-fidelity scanning of adjacent spaces, surroundings, etc., including real-time traffic/road conditions, weather conditions, and the like, at a high granularity level.

Skilled artisans will recognize that regardless of where a collection agent is disposed or whether it is integrated within a vehicle or operative in association with smart infrastructural elements of the environment, the collection agent and/or associated hardware/firmware components, (e.g., including one or more sensors), may be considered as a "sensing point" for purposes of an embodiment of the present invention. Furthermore, the environmental data gathered, sensed, monitored, measured, detected, and/or determined by the associated sensors may be broadly grouped into internal sensory data and external sensory data, wherein internal sensory data may relate to the internal environment of a device, apparatus or vehicle, etc., with which the collection agent and sensors are associated. On the other hand, external sensory data may relate to the external environment, e.g., outside the vehicle in which the collection agent is disposed. By way of illustration, a sensor monitoring the braking system of a vehicle may generate internal sensory data (e.g., suspension, traction control, etc.) while an imaging sensor (e.g., a camera) and/or a proximity sensor of the vehicle may generate external sensory data relating to pedestrians, other vehicles, obstacles including animate and inanimate objects or fixed/mobile objects, etc. In a further classification scheme, sensors can be transport related sensors such as e.g., accelerometer, position data sensors (e.g., GPS), sound data sensors, (e.g., microphone or other audio sensor or sonar (sound navigation and ranging)) and visual data sensors (e.g., cameras, optical sensors such as Lidar or Light Detection and Ranging), or general environment sensors configured as mobile device sensors, wearable sensors, infrastructure sensors, and the like. In general, therefore, collection agents 102-1 to 102-N and associated sensors may be deployed in a variety of sensing point arrangements, collectively shown as sensing point assemblage 104, operative with respect to a geographical area, location, region, etc.

Sensing points 104 may be configured with suitable network interfaces (not specifically shown in FIG. 1) for communicating with one or more wireless communications networks, public/private data communications networks, etc., collectively shown as networks 116, via appropriate access infrastructures 114 using associated technologies, standards and protocols. By way of example, sensing points 104 may communicate with networks 116 using one or more wireless technologies involving IEEE 802.11b, IEEE 802.11a, IEEE 802.11g, IEEE 802.11p, HiperLan and HiperLan II standards, Wi-Max standard, OpenAir standard, Bluetooth standard, an Enhanced Data Rates for Global System for Mobile Communications (GSM) Evolution (EDGE) network technology, a $3^{rd}/4^{th}/5^{th}$ Generation network technology, Long Term Evolution (LTE) technology, High-Speed Uplink Packet Access (HSUPA) technology, Evolved High-Speed Packet Access (HSPA) technology, an Integrated Digital Enhanced Network (IDEN) technology, a Code Division Multiple Access (CDMA) network technology, a Universal Mobile Telecommunications System (UMTS) network technology, a Universal Terrestrial Radio Access Network (UTRAN) technology, an All-IP Next Generation Network (NGN) technology, an IP Multimedia Subsystem (IMS) technology, and a satellite telephony network technology, etc.

To facilitate high fidelity, high definition geospatial mapping/modeling of the sensed environment, sensing points 104 are preferably configured to operate with appropriate service logic (network-centric, device-centric, or a combination thereof) to prioritize the sensed environmental data and transmit the data to an environmental data processing (EDP) platform 120 coupled to the network 116. In one embodiment, EDP platform 120 may be disposed at an edge network location of the cellular radio networks serving the respective sensing points. In an additional or alternative arrangement, EDP platform 120 may be disposed at a cloud-based datacenter. As will be set forth in additional detail below, the environmental data may be prioritized responsive to, for example, at least one of a determination of cellular RAN resource capacities available to the respective sensing points or collection agents, cost of the cellular RAN resource capacity available to the collection agents, and/or relative urgency/relevancy of the sensed data with respect to the events observed within the environment.

Irrespective of where an embodiment of EDP platform 120 is deployed, the received environmental data may be collated, processed and analyzed for generating suitable output data that may be consumed by one or more data consumption points 118-1 to 118-K, which may be individuals, entities, manual/autonomous vehicles, robotic equipment, etc. within the environment and/or other entities or third-parties, including governmental agencies or public safety answering point (PSAP) networks, and the like. Further, output data may be provided to the data consumption points 118-1 to 118-K in a variety of modalities, e.g., push, pull, push/pull hybrid, on-demand, etc., as a subscription-based service or as part of a zero-rated service. In one embodiment, the received environmental data may be processed using various techniques such as expert systems, machine learning, artificial intelligence, adaptive neural networks, pattern recognition, fuzzy logic, heuristic analysis, statistical analysis, Big Data analytics, etc. In a further arrangement, the received environmental data may be processed in conjunction with data from other sources, e.g., third-party data aggregators, network operators, public/governmental agencies, and the like.

Figure 2B:
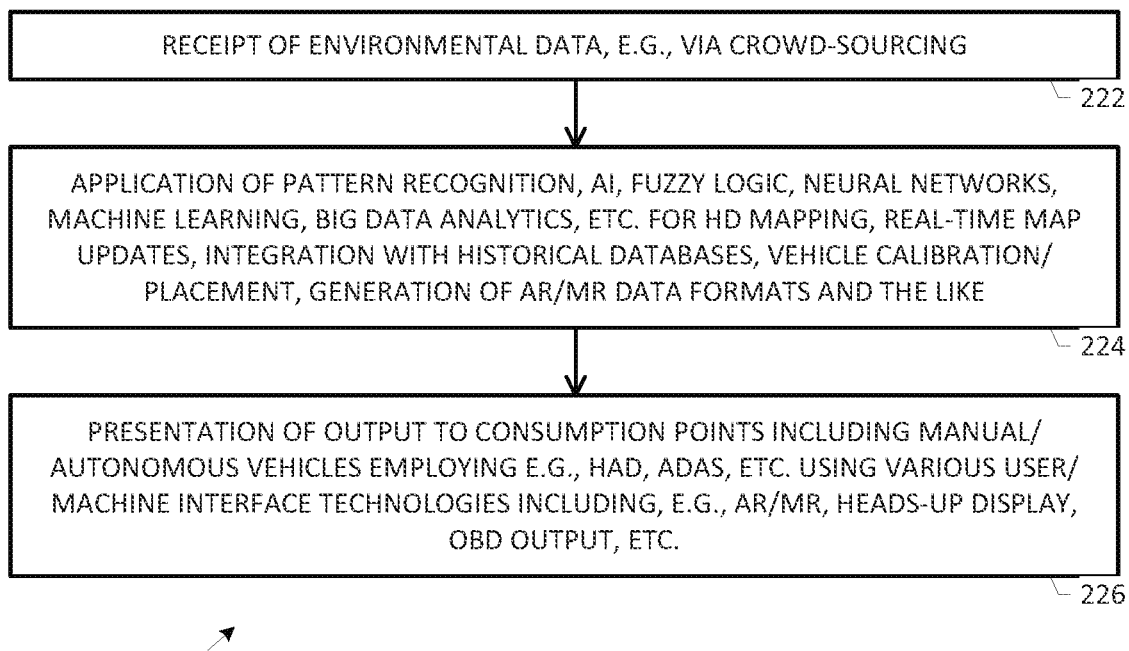

FIGS. 2A and 2B are flowcharts of various blocks, steps and/or acts that may be (re)combined in one or more arrangements, with or without additional flowcharts of the present disclosure, for facilitating environmental and ambient sensory recognition according to one or more embodiments of the present patent application. In particular, process 200A is exemplary of a network-assisted scanning of a surrounding environment operative in an embodiment of the network architecture 100 set forth above. At block 202, collection/sensing of internal and external environmental data, e.g., sensory data, may performed by collection agents in association with one or more sensors, e.g., IoT entities, mobile phones, smart wearables, vehicular/on-board telematics, etc. At block 204, a process of evaluation and prioritization of data may be executed in view of available network resources, e.g., including but not limited to: compute resources, storage resources, radio transmission resources, cost constraints, criticality/significance of observations and events, network/device related timing constraints, etc. (e.g., responsive to network-based service logic in association with the collection agents). Responsive to the prioritization/evaluation, the raw sensory data may be uploaded to one or more edge network/compute nodes, cloud-based datacenter nodes, and/or data consumption agents (e.g., Vehicle-to-Vehicle (V2V) and/or Vehicle-to-Infrastructure (V2I, or somewhat synonymously, V2X) communications in one embodiment), as set forth at block 206. In a further arrangement, the raw sensory data may also be locally processed and/or cached (i.e., at the sensing point) for facilitating optimal utilization of the available cellular RAN resources (e.g., depending on signal strength, data compression, delta compression, etc.). In another arrangement, the sensory data may be transmitted by leveraging available lower cost servicing provided by mobile network operators (MNOs), mobile virtual network operators (MVNOs) and/or Internet service providers (ISPs). Examples of such lower cost serving may include zero-rating, toll-free data, and/or sponsored data, wherein the operator does not charge end users for uploading sensory data pursuant to a specific differentiated service application (e.g., as a bundled client data service) in limited or metered data plans of the end users. Skilled artisans will recognize that from the end user's and/or vehicle manufacturer's perspective, contributing the sensory data may be seen as "optional," and therefore may be amenable to sharing/uploading the sensory data. Otherwise, if the parties are required to pay for the bandwidth, it may deter data contributions. Accordingly, uploading the sensory data pursuant to a zero-rating scheme is particularly advantageous in an embodiment of the present invention.

Process 200B shown in FIG. 2B is broadly representative of a process that may be executed in association with an EDP platform according to an embodiment of the present invention. At block 222, various pieces of environmental data may be received from a plurality of sensing points, e.g., individuals, intelligent/connected robotic equipment, smart infrastructural components, manual/autonomous vehicles, IoT-based entities, etc. As noted above, the environmental data may be transmitted/received upon prioritization for optimizing available radio resources. Also, in one example implementation, the environmental data may be transmitted/received pursuant to a crowd-sourcing arrangement or sourcing model where the information may be obtained by enlisting a large number of individuals, vehicle operators such as taxicab drivers, or corporate entities operating a fleet of autonomous vehicles, etc. that agree to use a collection agent for a fee, benefit, value and/or other monetary/non-monetary consideration. An analytics engine executing at the EDP platform is operative to apply techniques such as, e.g. pattern recognition, artificial intelligence (AI), fuzzy logic, neural networks, machine learning, big data analytics, etc., as noted above, for generating 2D/3D high definition (HD) maps, providing real-time map updates (delta updating), integration with historical databases, vehicle calibration/placement, route planning, generation of AR/MR-friendly data output formats, and the like (block 224). Suitably rendered output may be provided to one or more consumption points (block 226), e.g., including manual/autonomous vehicles employing technologies such as highly assisted driving (HAD), advanced driver assistance system (ADAS) control, connected driving, etc. using various user/machine interface technologies including, e.g., AR/MR, Heads-up Display (HUD), On-board Display (OBD) output, etc. As will be further exemplified below, additional use cases for the output data may involve, without limitation, the following under the broad category of real-time ambient-assisted awareness: real-time AR/MR rendering for assisting cyclists or pedestrians in some fashion, e.g., highlight various road dangers/obstacles, including animate and inanimate objects; real-time AR/MR rendering for helping tourists discover local surroundings' status with images and sounds (e.g., local languages or music) they may be familiar with; real-time AR/MR rendering for facilitating visually or hearing impaired people to discover local surroundings' status with images or sounds they may be able to see or hear; real-time AR/MR rendering and placement of native advertisements, etc.

Figure 3B:
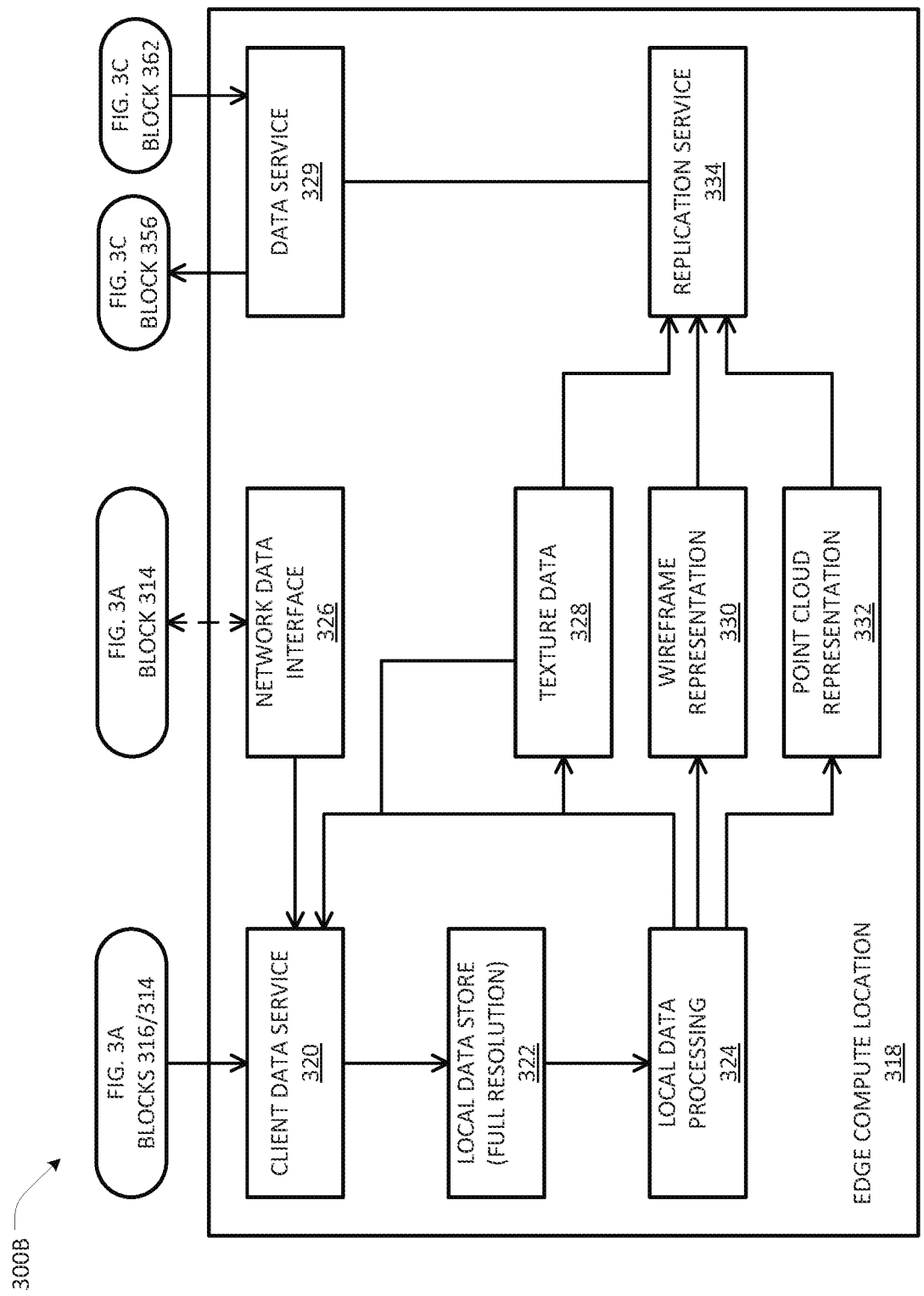
Figure 3C:
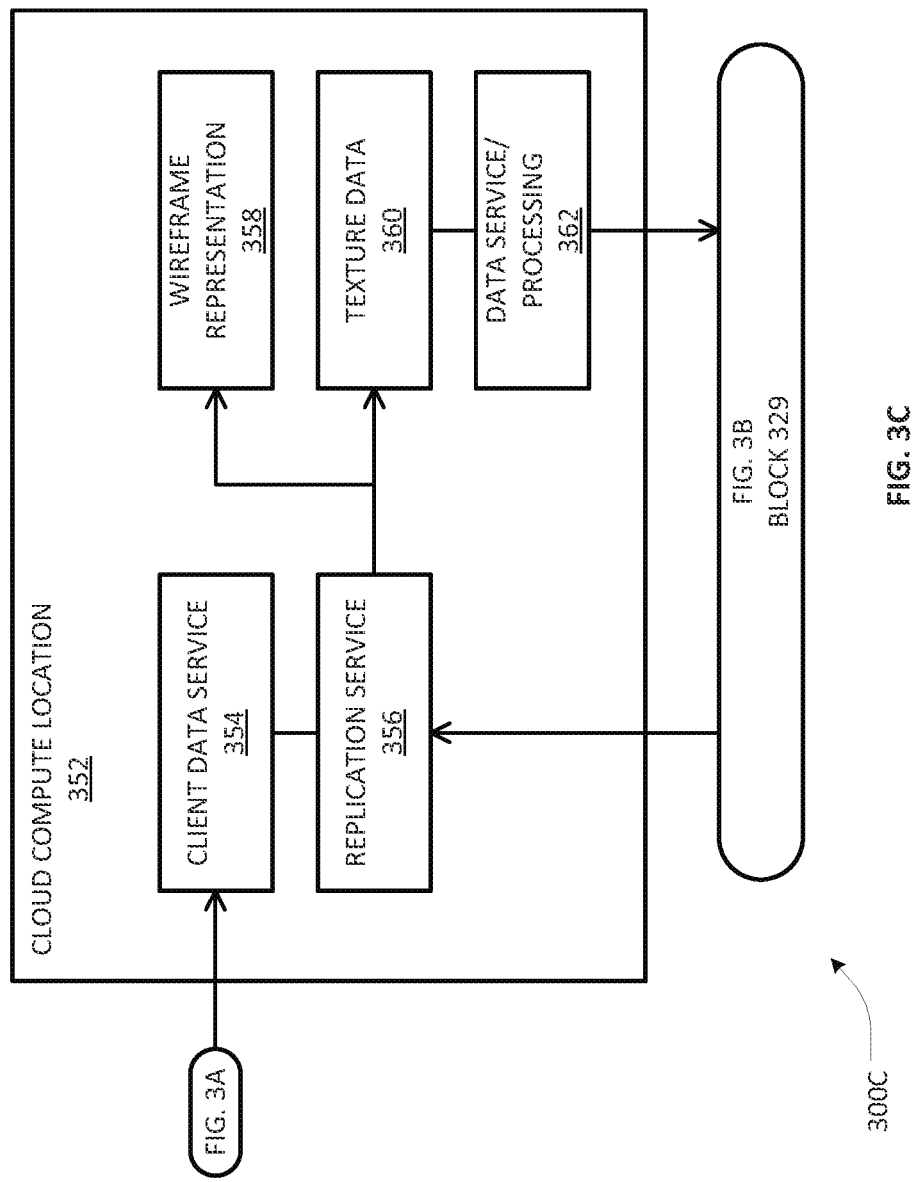

FIGS. 3A-3C depict portions of a functional block diagram illustrative of various components, blocks, network elements and/or apparatuses that may be combined into an example implementation or arrangement 300A-300C of the network architecture of FIG. 1 according to one embodiment. A sensing point platform or system 303 shown in portion 300A including a collection agent (CA) 302 and a plurality of sensor systems such as camera 304, GPS 306, accelerometer, sound, light, etc., collectively shown at reference numeral 308, is operative with an application support library 310 that can run a client data service application for purposes of scanning and uploading of sensory data and receiving/rendering of output data. Where AR/MR technologies are involved, an AR rendering module 309 may also be provided. As noted previously, CA 302 may be configured to run on a suitable device platform (e.g., a mobile device) and operative to collect data from sensor systems 304, 306, 308 (where provided). CA 302 may also be configured to turn the sensors on or off, depending on deployment needs, such that no data may be collected when the sensors are turned off. In one arrangement, CA 302 may communicate with an edge network node having an EDP platform, e.g., edge compute location 318 shown in portion 300B, preferably via a RAN 314. Although other access networks or interfaces 316 (e.g., WiFi) may be used where applicable, it will be realized that some embodiments of the present invention can be particularly more advantageous when using RAN. Further, when communicating through a RAN, a suitable network data interface 326 may be used in an example embodiment for collecting information about the state of the network as will be set forth below in further detail. When CA 302 becomes available or comes online (e.g., car ignition in a vehicular use case scenario), CA 302 connects to a Client Data Service (CDS) 320 hosted at the edge compute location 318. In one embodiment, CDS 320 may be configured to check a current data representation, if available. If the current data representation is stale (e.g., beyond a certain age, which may vary by resource type), and unique (e.g., no other CA is providing this data), CDS 320 may be configured to instruct CA 302 to provide the necessary data types, e.g., sensory data. In case of RAN access, in an additional or alternative arrangement, CDS 320 may be configured to further prioritize the need for new data against the current network load, and only use paid—or higher priced data—if the information is relevant and/or urgently needed. In one example implementation, relevance and/or urgency of the information may be evaluated and/or determined using statistical/probability analysis, heuristics, adaptive predictive modeling, etc. For example, a relative score of "0" may be provided to indicate no or low relevance and/or urgency whereas a relative score of "10" may indicate a high degree of relevance and/or urgency. Responsive to prioritization (e.g., by CA 302, CDS 320, or in any combination), the sensory data may be streamed by CA 302 to a local data store buffer 322 in the edge compute location 318. In one example embodiment, local data store buffer 322 may be configured to accept full resolution data. In another variation, when possible, the raw data from sensing point 303 may be processed together with previous data to update the local maps (i.e., world representations). In one embodiment, local data processing 324 may be configured to provide or generate local world representations that may comprise a Point Cloud Representation 332 (e.g., as points in a 2D/3D Cartesian coordinate system, polar coordinate system, etc.) of the sensed/scanned environment or world, a wireframe representation 330 (e.g., triangles, etc., which is a simplified model useful for rendering), and a texture data repository 328. In one variation, world representation data comprising point clouds 332, wireframe models 330, and/or texture repositories 328 may be periodically synchronized with a central cloud compute location 352 (shown in portion 300C), e.g., via a replication service 334 and associated data service 336. The central cloud compute location 352 can also request any of the data needed, e.g., via cloud-based replication service 356 and associated data service 362, wherein the requested data can vary from a single image to a full video clip and time- and location-stamped sensor readings as needed. By way of example, cloud-based wireframe representation 358 and cloud-based texture data repository 360 are illustrative of world representations hosted at the cloud compute location 352.

When a client needs the data (e.g., sensing point 303 also operating as a consumption point), for example, to render the data in an AR presentation, it can request the data either from a central service (e.g., downloading an "offline mode" map for an area that may have poor coverage) or, on demand, from central cloud locations 352 or edge locations 318 as needed. In the example embodiment, this data may be represented as at least the wireframe representations 330/358, and possibly the texture data 328/360. The wireframe representation(s) 330/358 allow(s) the AR rendering module 309 to identify where in the "virtual" world to render images such that they correctly overlay with the physical world (e.g., as seen by a human driver in her field of view). In one arrangement, such identification and placement of AR-rendered objects in a physical field of view may be accomplished using the techniques set forth in the following commonly-assigned co-pending U.S. patent application: (i) "SYSTEM, METHOD AND ARCHITECTURE FOR REAL-TIME NATIVE ADVERTISEMENT PLACEMENT IN AN AUGMENTED/MIXED REALITY (AR/MR) ENVIRONMENT", application Ser. No. 15/609,683, filed May 31, 2017, in the name(s) of Thao H T Nguyen and Meral Shirazipour, incorporated by reference herein.

It should be appreciated that providing output data in a pre-processed data format means there is very little effort on part of the device needed to accomplish data rendition. Additionally, the rendered data could be furthered enhanced with third-party data sources (e.g., not directly from local sensors), and could be further formatted as to be personalized for the end consumption point (e.g., based on end user's profile data). Furthermore, the foregoing mechanisms described above can be applied in variations of suitable combinations and sub-combinations as well. For example, in a vehicular use case scenario, even if there is no RAN congestion, the system may elect to collect low-resolution data for areas where there has been no change the past few scans, and, should it detect a change, have the next vehicle collect the higher-resolution data (e.g., as a data probe vehicle). It may also be useful in some example embodiments to collect accelerometer data, position data (e.g., GPS) and/or sound data, etc. alone without scanning visual data.

Figure 4A:
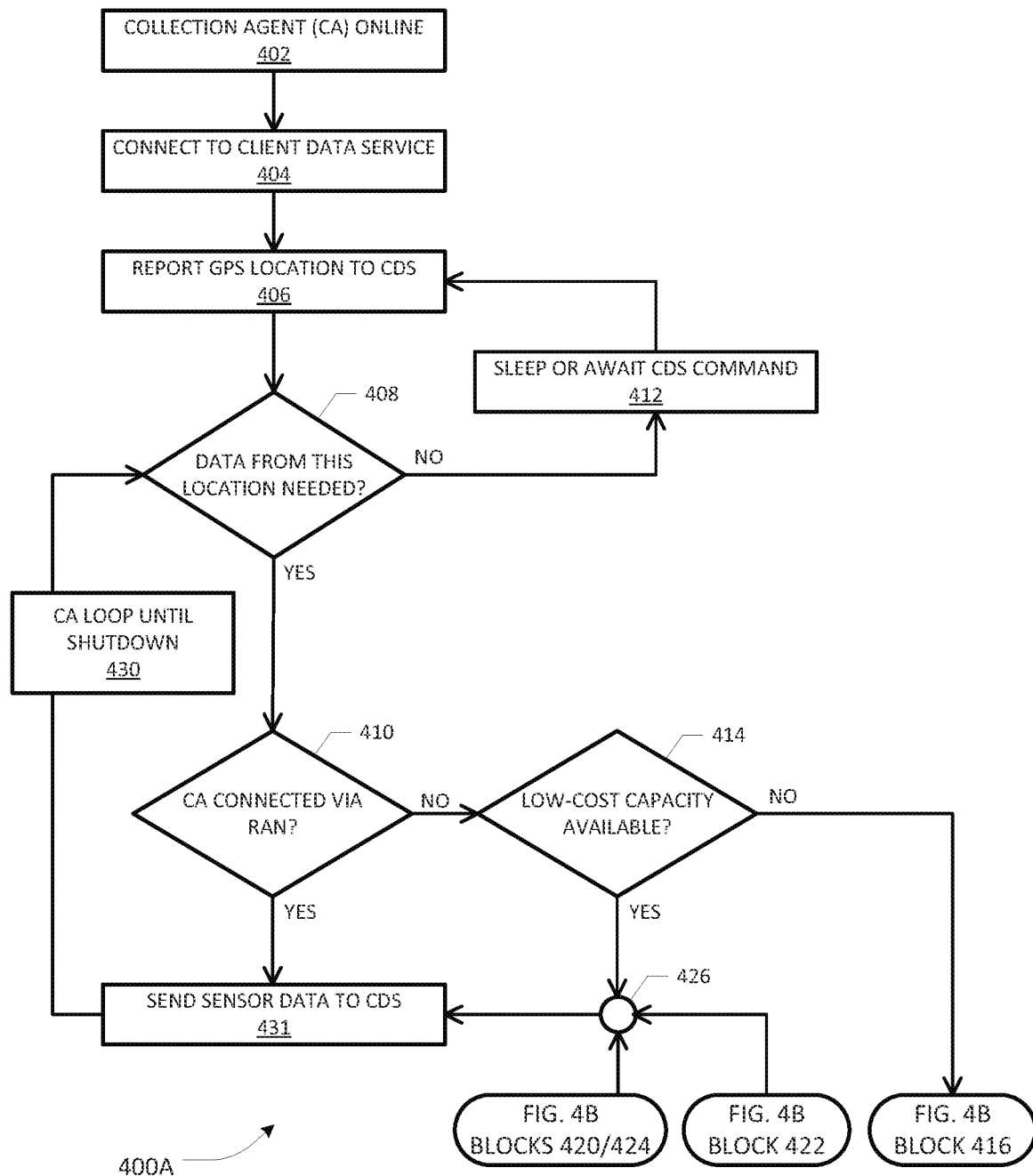
FIGS. 4A-4B are a flowchart of various blocks, steps and/or acts that may be (re)combined in one or more arrangements, with or without additional flowcharts of the present disclosure, for facilitating optimized use of network capacity for purposes of an embodiment of the present patent application.
Figure 4B:
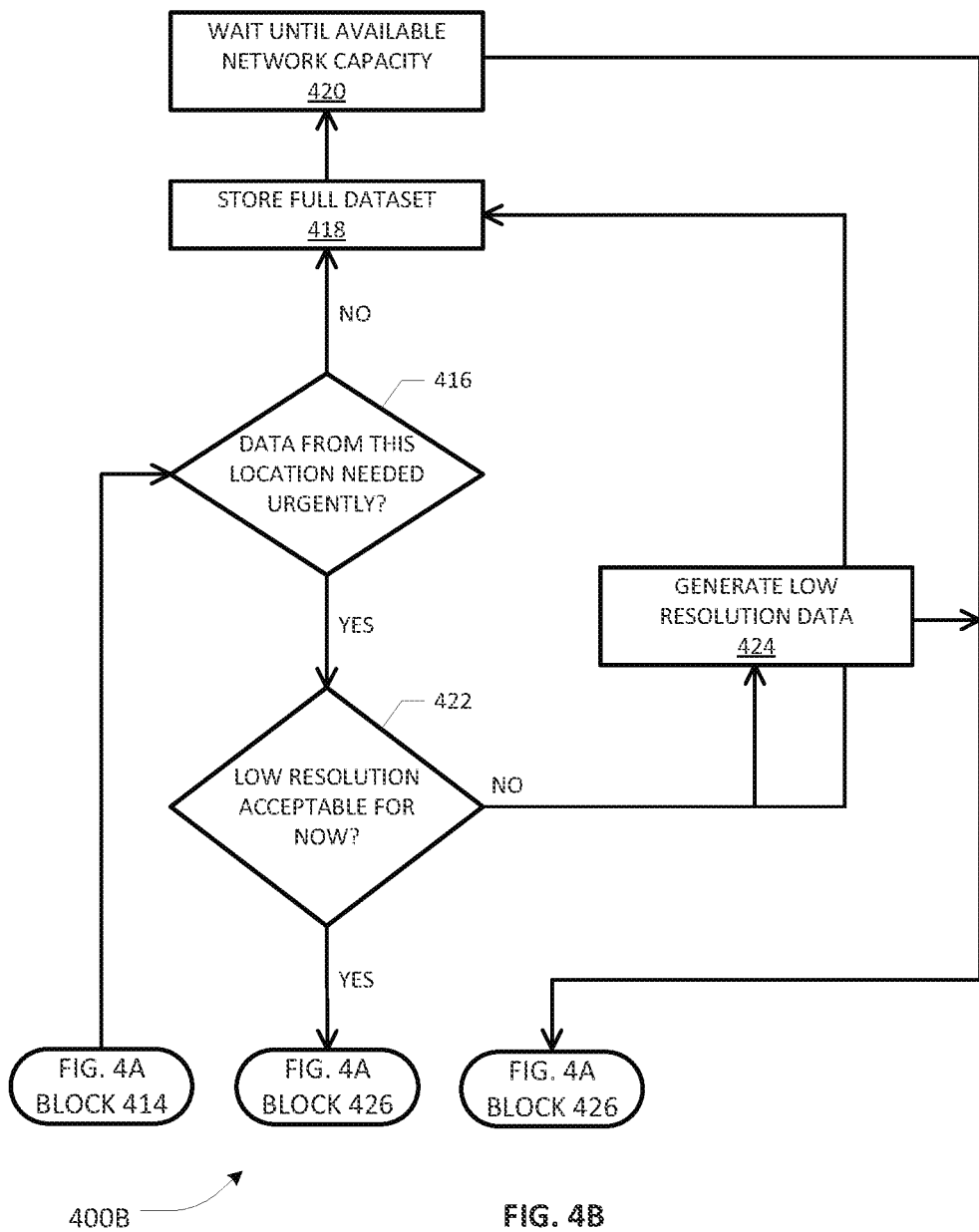

FIGS. 4A and 4B depict portions of a flowchart of various blocks, steps and/or acts that may be (re)combined in one or more arrangements, with or without additional flowcharts of the present disclosure, for facilitating optimized use of network capacity according to an embodiment of the present patent application. An example process comprising portions 400A/B, which may be effectuated by way of a network data interface such as block 326 of the arrangement 300A-300C described above in respect of FIGS. 3A-3C, may commence when a collection agent comes online (block 402) and connects to a client data service or CDS (block 404). Suitable geolocation data, e.g., GPS data, longitude/latitude data, postal address data, etc., may be obtained or otherwise determined by the collection agent, which may be reported to the CDS, as set forth at block 406. A determination may be made at block 408 as to whether environmental sensory data from the location of the collection agent is needed, e.g., depending on whether the data is new, complementary to existing data, relates to a traffic observed in the vicinity of the associated sensing point, etc. If the sensory data from the reported location is not needed for some reason, the collection agent may transition to a sleep or standby mode and/or may await commands or instructions from the CDS (block 412) until new/additional location data is collected (block 406). Otherwise, if the sensory data from the reported location is determined as necessary, a further determination is made regarding whether the connection agent is connected via a suitable RAN (block 410). Various further determinations may also be performed in association with RAN connectivity in additional or alternative arrangements. For example, in a dual-mode or multi-mode mobile device having the capability to connect to multiple cellular networks, possibly using different RAN technologies, relative signal strengths, signal-to-noise (S/N) ratios, interference, and other channel indicators may be used in determining, estimating and/or selecting available radio network resources with respect to the reporting collection agent. If suitable RAN resources are available, sensory data may be transmitted between the collection agent and associated CDS (which may be associated with an edge compute location and/or a cloud-based location), and may be mediated by way of push, pull, push/pull, or other transfer mechanisms (block 431). Further, as set forth at block 430, sensory data transfer or upload process may continue to take place in a loop until the collection agent is shut down, moves out of a radio service area, or upon instruction from CDS, etc.

If it is determined that the collection agent is not connected with a RAN (block 410), a further determination may be made as to whether a low cost capacity is available, as set forth at block 414. If so, the low cost capacity may be utilized in transmitting the sensory data as indicated at flow control point 426. If no low cost capacity is available for data transmission, a still further determination may be made whether the data from the reported location is urgently needed, set forth at block 416 in portion 400B. As noted previously, determinations as to data relevance, urgency, significance, reliability, etc. may be made using a variety of statistical/probabilistic analysis, heuristics, AI, expert systems, adaptive predictive analysis, etc. If the sensory data from the reported location is urgently needed, a still further determination may be made whether data at a lower resolution or coarser granularity is acceptable, e.g., for the current time being (block 422). If so, the sensory data may be processed accordingly and transmitted as indicated at flow control point 426 via a low cost option for instance. Also, if the data from the reported location is not urgently needed, the data may be locally stored (block 418). Likewise, if low resolution data is not needed for now, such low resolution data may be generated (block 424) and stored as well (block 418). In one arrangement, the stored data may be transmitted when network capacity becomes available, e.g., responsive to a scheduling mechanism (block 420).

Skilled artisans will recognize upon reference hereto that a key advantage of the foregoing embodiment is the ability to collect and process a vast amount of data needed for AR/MR/VR world modeling, for example, in a distributed and low cost manner, using knowledge of the network state to update the virtual world in the background during low contention periods and only for matters of high priority (e.g., safety applications) during contention/congestion periods. In a network-assisted scanning mechanism as set forth above, an embodiment of the present invention therefore involves signaling the collection agent about if any data is needed, what resolution is needed, whether to store data and defer transmission, and performing such tasks/determinations based on balancing current network conditions versus the priority of the data.

Figures 2, 14A:
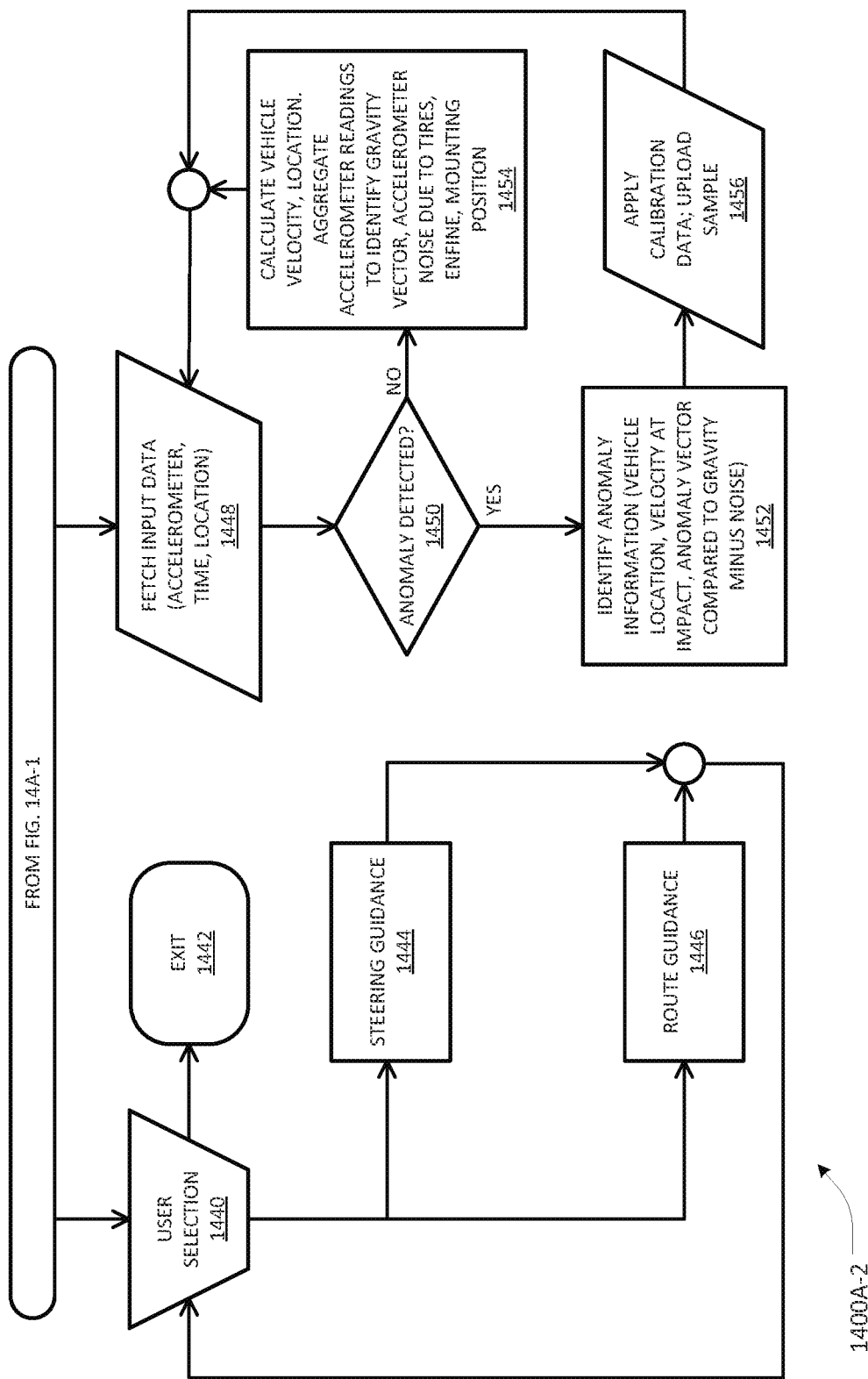
Figures 3, 14A:
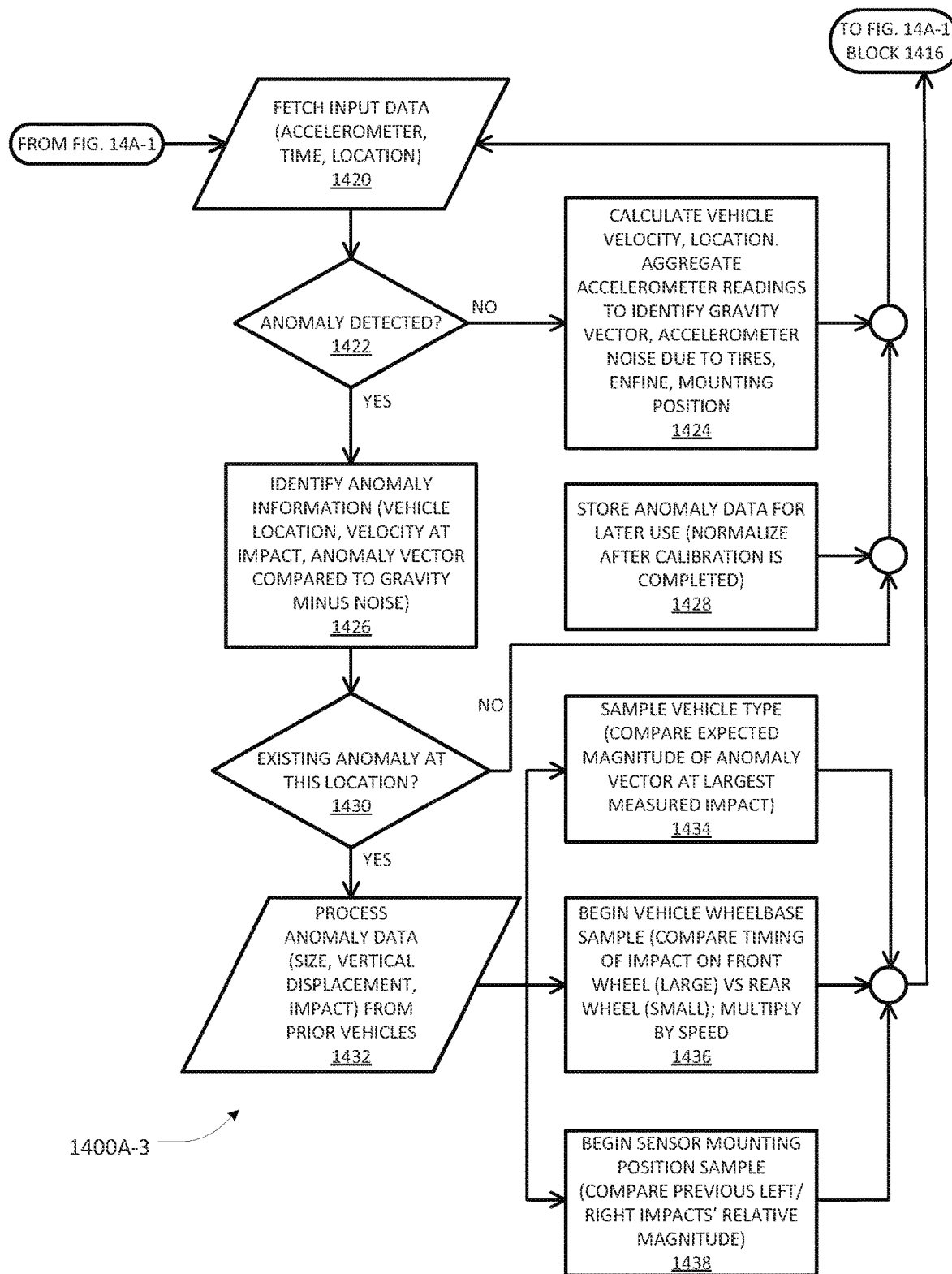
Figure 14B:
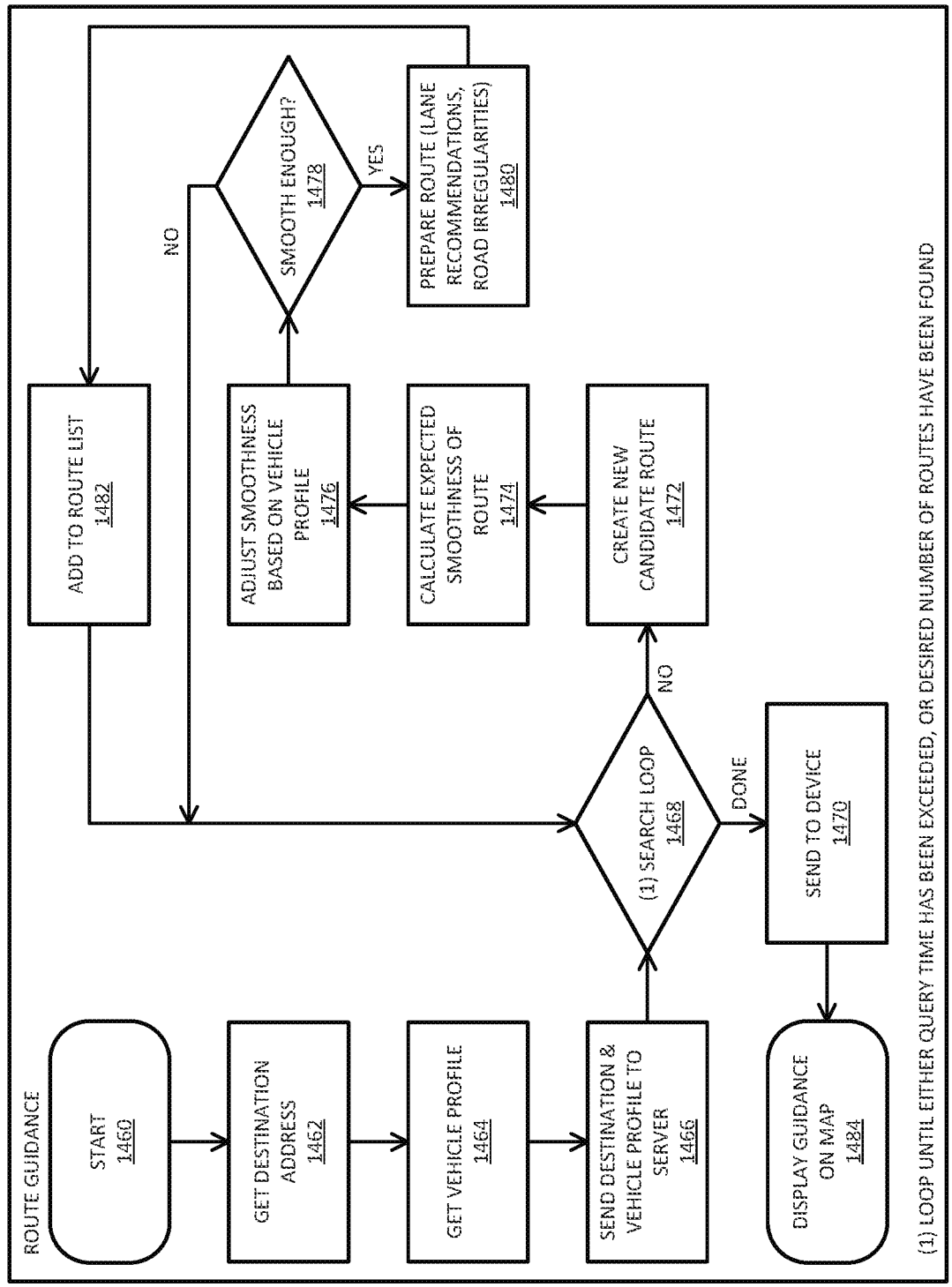

As discussed elsewhere in the present patent application, the HD mapping of surrounding environments is needed not only by autonomous/manual vehicle use cases but in other scenarios as well. By way of further example, one demanding use case scenario is the real-time rendering of the environment for real-time AR/MR/VR content generation. Another example is the use of AR/MR to enhance safety for drivers, which requires not only a precise mapping of the road environment but also a timely update of the environment. Such embodiments may be configured to, e.g., highlight precise locations on the road ahead (in AR/MR) that may be dangerous above certain speed (e.g., AR/MR used to highlight black ice or a wide/deep pothole on the road). Accordingly, it should be further appreciated that although the embodiments set forth in FIGS. 3 and 4 highlight vehicular-related sensory data use case, the teachings therein are equally applicable, mutatis mutandis, in other use case scenarios as well, e.g., a pedestrian's mobile device, smart wearables, smart infrastructure elements, AR/MR-based UE devices, etc.

Figure 5:
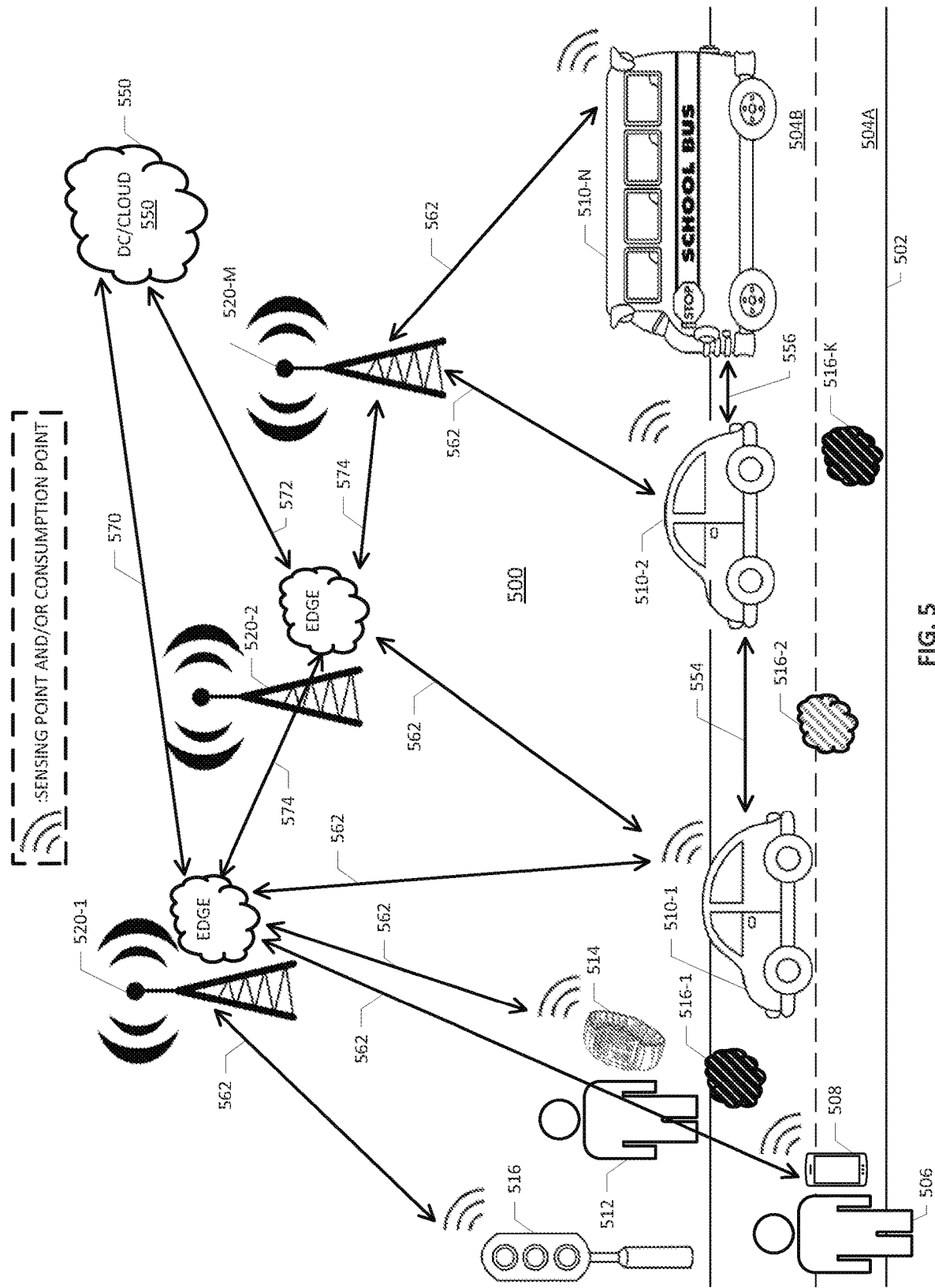
FIG. 5 depicts an example implementation of the network architecture of FIG. 1 that illustrates one or more sensing points and one or more consumption points according to an embodiment of the present patent application.

Turning to FIG. 5, depicted therein is an example use case implementation within the network architecture of FIG. 1 that illustrates one or more sensing points and one or more consumption points according to an embodiment of the present patent application for purposes of geospatial sensing of an area or region 500. An example road segment 502 disposed in the area 500 is comprised of a plurality of lanes 504A, 504B that may be traversed by a plurality of autonomous/manual vehicles 510-1 to 510-N. As illustrated, a plurality of obstacles 516-1 to 516-K are representative of obstacles such as e.g., bumps, potholes, ice patches, etc. that may be present in the road segment 502. Pedestrians 506 having mobile communications devices 508, pedestrians 512 having smart wearables 514 and smart infrastructure elements 516 as well as vehicles 510-1 to 510-N are operative with respective collection agents and radio connectivity such that they may operate as environment sensing points with respect to respective vicinities, wherein at least some of which may operate as consumption points as well (for example, where a 3D model of the surrounding environment and/or vicinities including the road segment 502 may be required for an AR/MR application). A plurality of RAN infrastructure elements 520-1 to 520-M are operative to effectuate suitable radio links with the sensing/consumption points using applicable technologies, standards, protocols, as noted previously. One or more inter-vehicular communications may be effectuated via V2V network paths 554 and 556 with respect to the vehicles 510-1 to 510-K. One or more RAN edge elements 520-1, 520-2 may communicate via backhaul/backbone networks 570, 572 with a cloud-based datacenter (DC) platform 550 configured to host appropriate CDS servers, data analytics, HD mapping databases, etc. By way of illustration, RAN edge elements 520-1, 520-K may also communicate with each other via appropriate network paths 574.

Figure 6:
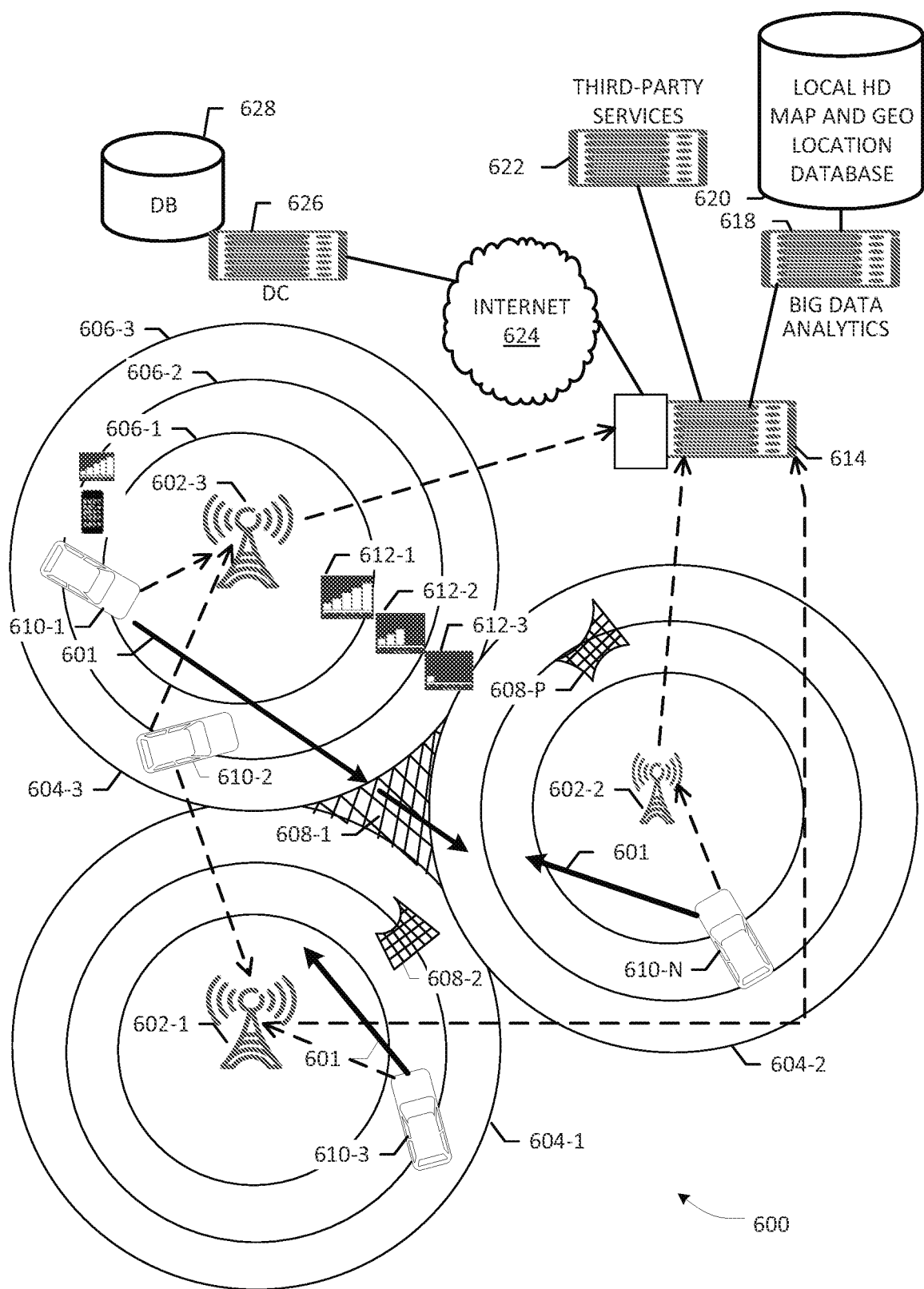
FIG. 6 is an example wireless network environment for facilitating resource-based environmental data collection and processing for purposes of one or more embodiments of the present invention.

FIG. 6 is an example wireless network environment for facilitating resource-based environmental data collection and processing in a vehicular use case scenario according to an embodiment of the present invention. By way of illustration, example wireless environment 600 is shown as comprising a plurality of coverage areas, e.g., areas 604-1 to 604-3, effectuated by appropriate wireless network infrastructure elements, e.g., base stations 602-1 to 602-3, corresponding thereto. As is known in the art, a radio coverage area by a base station may take any shape and include varying levels of signal quality and strength, wherein there may be some coverage overlap/gap depending on a number of factors. Illustratively, coverage areas 604-1 to 604-3 are exemplified as circular regions, each having a plurality of concentric signal quality/strength contours. By way of example, coverage area 604-3 is shown to include three such contours 606-1 to 606-3, each depicted with a respective signal level indicator icon, 612-1 to 612-3, respectively. Contour 606-1 having the highest signal quality is closest to base station 602-3, whereas contours 606-2 and 606-3 are spaced further away from the base station, with progressively deteriorating signal quality (i.e., strength, level, more interference, etc.). A plurality of vehicles 610-1 to 610-N are illustrated as traveling along respective routes 601 that may traverse various portions of the coverage areas 604-1 to 604-3, wherein the routes may have varying obstacles, hazards, traffic congestion conditions, road surfaces, lane closures, etc., which are generically shown at reference numerals 608-1 to 608-P. As an example, UE-carrying vehicle 610-3 is operative as a sensing/consumption point that is illustratively shown as traversing from coverage area 604-3 to coverage 604-2, via a path or route 601 that involves a hazard 608-1. Skilled artisans will recognize that whereas some vehicles have a UE that executes a collection agent application, other vehicles may be provided with integrated vehicle controller units having the collection agent functionality for purposes of the present invention.

To facilitate network-assisted scanning, a number of network nodes or elements may be configured to interface with or otherwise be deployed as part of the wireless network environment 600. For example, a mobile-optimized edge network node 614, which may be provided as part of a radio network controller (RNC) node serving base stations 602-1 to 602-3, may be configured to host a CDS application as discussed above in detail. A data analytics platform 618 may be co-located with or otherwise coupled to the edge network node 614 for local data processing (i.e., edge compute location). A local storage of processed data suitable for accelerated AR/VR/MR processing/rendering as well as HD mapping may be provided as a database 620 wherein the data may be indexed to the geolocation data of the sensing points depending on their reporting locations and/or collated, correlated, or otherwise combined with third-party data services 622. Also, in one embodiment, the edge network node 614 may be interfaced via the Internet 624 to a datacenter 626 and associated cloud-centric database 628.

As the sensing points 610-N traverse through the coverage areas 604-1 to 604-3 via respective routes 610, their signal qualities with respect to the serving base stations may vary, including potential service outage. Accordingly, signal quality of different sensing points with respect to the same obstacles may also vary, some having better quality than others, depending on which base station is used. CDS application executing at the edge network node 614 may therefore select data from different sensing points so as to obtain best quality data from appropriate sensing points with respect to the surrounding environment including traffic/ road conditions and obstacles 608-1 to 608-P. In other words, if two sensing points are capable of reporting sensory data with respect to a particular obstacle/condition, one connected in a better RAN coverage area than the other, the CDS service logic may be configured to select the sensory data from the better-connected sensing point with respect to the sensed obstacle/condition. As noted previously, where the data transfer is being deferred, collected data may be cached and scheduled for delivery according to a suitable scheduling mechanism. Skilled artisans will therefore recognize that various combinations of sensing points, signal strengths, channel conditions, transport costs, data relevance/urgency, etc. may be implemented for optimally obtaining the sensory data pertaining to the surrounding environment, preferably at varying resolutions, in an example embodiment of the present invention.

Among the several advantages of the present invention, it will be further realized that an example embodiment provides for placing the relevant data at a nearest edge computation node, wherein localized geospatial data may be leveraged by performing initial processing of the raw data and turning it to a simplified model in a local processing node. Typically, this arrangement poses little to no detriment to overall data quality and, accordingly, an example embodiment of the present invention may be configured to send far less data upstream for central processing, thereby reducing overall bandwidth usage. Skilled artisans will further appreciate that this practice can also be advantageous with respect to privacy concerns depending on how data collected is being pre-processed and encoded. Since data retrieval and/or scheduling may be coupled with prioritization, the local processing can reduce costs further by being intelligent about how and when it receives data. Depending on traffic density and network load, it can increase or decrease the frequency or resolution of the data that clients may upload, or signal them to defer it to a later cell tower that may have more capacity. As network usage may shift drastically quickly, e.g., depending on routes being taken, dynamic/unpredictable traffic conditions, etc., a local processing node is better suited for these types of decisions.

Moreover, by applying priority principles and policies, an embodiment of the present invention may be configured to further lower the cost of data transfer by selectively choosing when and where to transmit data as noted above. Armed with the knowledge of current network usage, encounters of a significant road anomaly, such as a fallen tree, an accident, a sinkhole, flooding, debris, or any number of anomalies (whether actual or fictional, e.g., mirage) in an environment may be appropriately handled. For example, an initial scan of the area can likely be of low resolution; once processed, the cloud service can recognize the presence of an anomaly and request the next vehicle/sensing point in the area to perform a high-resolution scan. However, especially in the case of an accident, the network may be congested because of it; emergency vehicles, autonomous UAVs or AUAVs, news crews, or even passerby humans using social media can place a high load on the network. An embodiment of the present invention can therefore be advantageously configured to obtain knowledge of the load on a nearby cell or coverage area and determine that it can receive the data within a certain amount of time (e.g., 45 seconds later) due to the travel time to the next cell, but minus the transfer time gained from the additional bandwidth, potentially at a lower cost, as part of optimization balancing of cost and data delivery as previously noted.

Furthermore, as an embodiment of the present invention can be configured to provide sensory data updates at a fixed or lower cost, in addition to utilizing unused network capacity, e.g., on a scheduled basis, to increase the resolution of the scans. For instance, an embodiment of the present invention can be configured to free up network capacity if needed, and detect there are no significant updates needed at current time. Additionally or alternatively, the system can adjust, throttle or change the resolution of scans based on the knowledge of the edge network in a dynamic, on-demand manner. One reason for this is the ability to locally monitor and control data in manageable chunks, where the quantity might instead become too bulky for central processing. For example, consider the following traffic condition scenario. On an average day, X vehicles per minute may pass by a location, increasing to 2× or 3× vehicles per minute during peak times. This volume can easily be managed in-memory by a local edge processing node, but may require complex caching and tiering operations for full central processing (e.g., a cloud).

In a still further arrangement, an example embodiment of the present invention may be configured to provide increased spatial resolution, including at varying levels of granularity. For example, instead of uploading the road data only at specific road segments, or ignoring accelerometer data under a certain threshold, or recording visual data only at certain points (e.g., a street view only being available at intervals), a network-assisted processing mechanism at a local processing center may be configured to instruct the scanning device or sensory system to upload a higher resolution dataset on an area that either has not been scanned before, or needs additional updates only. As can be appreciated, sending the information to a consumption point such as a moving vehicle as rapidly as possible is of particular importance since the system, for privacy or security reasons, may not be informed whether the selected vehicle will stay at the current reporting location (e.g., an intersection) or move to another one.

It will be apparent to skilled artisans upon reference hereto that a base system according to the foregoing teachings may be utilized in a vehicular use case scenario with particularly advantageous features where detailed road data may be provided for facilitating precise driving recommendations, commands or advisory messages in a further implementation. Set forth below are further aspects that describe additional embodiments with respect to providing such highly assisted driving (HAD) or advanced driver assistance system (ADAS) control for purposes of the present patent application.

Broadly, an overall example system with respect to a vehicular navigation recommendation use case is set forth immediately below, with additional details and embodiments being provided in later sections. An example arrangement of the present invention may be configured, as part of the course of navigation of a vehicle, to perform a simulation of the route, and suggest changes to the route, such as using a different lane of travel, using a better road nearby, or even which part(s) of the lane to utilize to skip specific obstacles (e.g., the most egregious bumps). This information may be provided for use by a human driver, or fed into an autonomous vehicle to facilitate a routing path (e.g., under supervisory control) such that the passengers get the smoothest ride and can enjoy whatever other activity they may be engaged in. Even with respect to a human driver, the data may be rendered and/or utilized in numerous ways. For example, a traditional GPS can consume the data and provide an output by either recommending a different, better route, or by using existing lane assist facilities to suggest to the driver that choosing a different lane, at least for a certain duration, can provide a smoother ride experience, or by suggesting a speed to travel for the affected stretch, or possibly combining the aforementioned. Also, a new visual representation may be provided that uses the spatial/positioning data gathered to overlay an AR "racing line" for the driver, showing not only which lane(s) to use, what speed(s) to use, but also which part(s) of the lane to use to get the ideal driving experience.

In one arrangement, an example embodiment may be implemented as a system comprising two components or subsystems, which may overlap in parts. A first component, portion or subsystem relates to data collection and processing, which is responsible for building a suitable knowledge-base of the world. As noted previously, this portion may be implemented using an embodiment of the network-assisted scanning of surrounding environments described in detail hereinabove although other data acquisition and processing mechanisms may also be used in an alternative arrangement. However, providing a network-assisted scanning mechanism according to the teachings of the present patent disclosure can advantageously allow for low-cost data gathering and navigational assistance processing, and thereby making it possible to overlay the data in enhanced, user-friendly presentations using AR/MR.

The second component, portion or subsystem involves the client-side application of providing navigational guidance and AR display to a human driver, or a 3D model of expected path routing for an autonomous vehicle, or a combination thereof. In either the autonomous vehicle case or manual vehicle case, a collection agent may be provided as part of a mobile device that may be mounted to the vehicle (e.g., referred to as an in-vehicle unit) or the collection agent functionality may be integrated within the vehicle for operating in conjunction with the on-board sensory devices, vehicle systems, diagnostic systems, display units, and the like, albeit at a higher initial investment cost.

In one arrangement, a base system embodying network-assisted geospatial scanning may be implemented for collecting road smoothness data. It will be appreciated that the general methodology for data collection may be configured to follow roughly the same process flow as described before, mutatis mutandis, except that the urgent data collection mode may not be used all that frequently. The collection agent may be configured in one embodiment to collect audio data indicative of road irregularity (e.g., conditional on user approval) for improved recognition of road surfacing. While the urgent data collection is no longer needed, the edge compute node may still be used for all other benefits, however. After the data is collected, processing for AR and HD world mapping can occur. Additionally, other sensory data relating to the vehicle, e.g., GPS data, optical image data, accelerometer, inclinometer, vehicle performance (e.g., ABS, steering, suspension, traction control, speed, etc. if available) and sound data may also be processed in order to identify the presence of road irregularities, their magnitude, as well as their location. This data may be used as raw input data in the following ways in an exemplary embodiment. In a first process flow, the vehicular usage data is calibrated to determine, e.g., vehicle type, class, etc. (i.e., calibration flow). Calibration may occur during the beginning, middle, or end of a driving session, depending on where the vehicle has an overlap with existing road data. It should be appreciated that since the reporting devices, e.g., mobile phones, whose placement, or even vehicle, may change from session to session, it is important to perform self-calibration in such usage conditions. Also, calibration can be done against other vehicles that have driven the same road (e.g., used as probe vehicles or sensing points). If that cannot be performed, e.g., due to lack of overlapping road/lane positions, the data may be stored and used for calibration later, e.g., to detect if the user is driving the same vehicle.

In one configuration, an example calibration flow may primarily focus on identifying a vehicle's response to road irregularities. This response depends on, inter alia, the reporting device's mounting position, the hardware used to attach to device (e.g., if a cell phone is used), the inflation, tread and type of a vehicle's tires, as well as the suspension and chassis characteristics. If the deployment involves built-in functionality integrated within the vehicle, some of these parameters may be determined by reading a controller area network (CAN) bus provided in the vehicle (e.g., tire inflation), or may be predetermined (e.g., mounting location). Lack of such information may mean calibration merely attempts to classify the vehicle at more generic level, e.g. "mounting position 4 of a sports car". In one arrangement, lane data (e.g., obtained from lane indicators or sensors) may used to identify the width of the car, while road irregularity data (e.g., impacts from driving over a crack or a rail) can be used to estimate the length of the wheelbase.

In a second process flow, the data may be used to determine which road, direction and lane the vehicle is travelling in (e.g., navigation data). When an irregularity is detected, e.g., primarily from accelerometer and audio data, the AR position derived from the base system may be recorded. This position can then be used to cross-reference the texture data from the given area to attempt to identify the type of irregularity, its exact location and size, its trajectory (if moving), and the like.

Responsive to the two process flows above, an embodiment of the present invention can be configured to update the HD mapping and navigational-assist database, depending on the granularity of input data, if possible.

Figure 9:
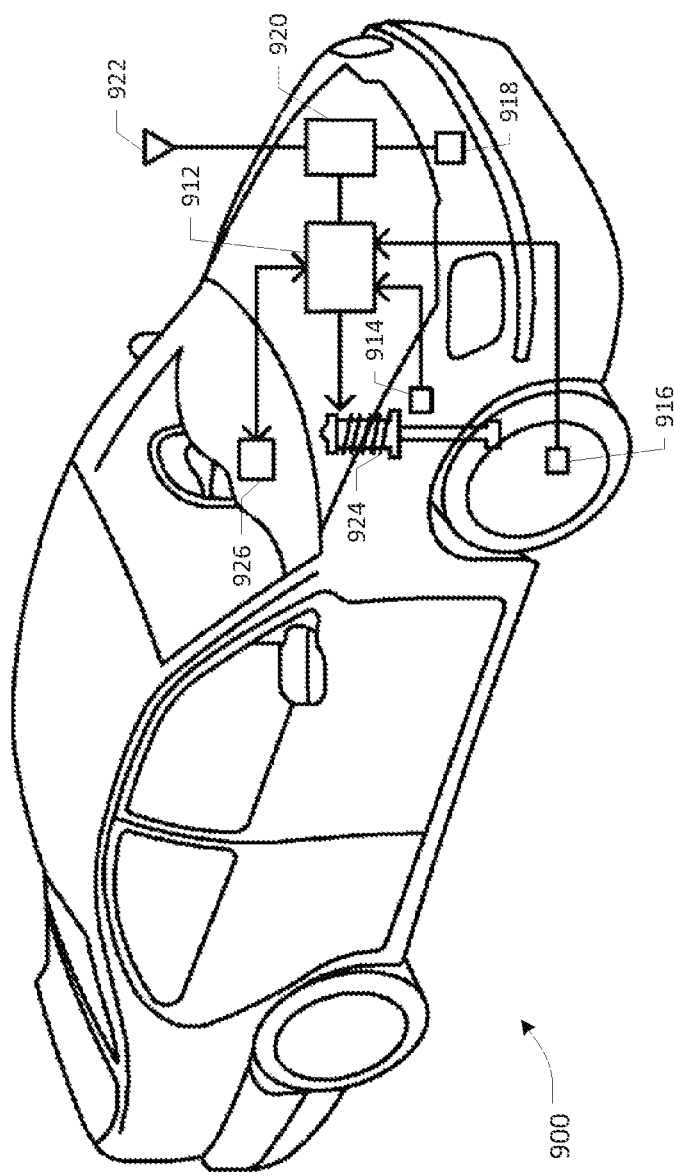
FIG. 9 depicts a diagram showing a manual/autonomous vehicle having various sensors and on-board monitoring devices operative with a collection agent integrated within the vehicle or in conjunction with a UE device placed within the vehicle for purposes of an embodiment of the present patent disclosure.

To further concretize at least a portion of the foregoing principles, attention is now directed to FIG. 9, wherein a diagram showing a representative manual/autonomous vehicle 900 is depicted as having various sensors and on-board monitoring devices operative with a collection agent integrated within the vehicle or in conjunction with a UE device placed within the vehicle for purposes of an embodiment of the present patent disclosure. By way of further illustration, vehicle 900 may be provided with a vehicle controller unit 912 that can be configured to operate as a sensing point or collection agent for obtaining ride quality and other vehicular data, which vehicle controller unit 912 may be coupled to various sensors and vehicle systems via a CAN. Where a wireless UE, e.g., cell phone, is used as a collection agent, the wireless UE may be mounted to or placed within the vehicle 900 at a specific location. Optionally or alternatively, where a built-in CA arrangement is provided, appropriate connectivity to the CAN bus may be achieved for obtaining various pieces of vehicular parametric data. A suspension damper system 924 may be coupled to the controller 912, which is further coupled to one or more suspension sensors 914 and one or more wheel sensors 916. A man/machine interface (MMI) 926 may be provided as part of a dashboard that allows a driver (i.e., in manual vehicle configuration) to interact with various vehicle controls, including but not limited to adjusting the suspension, monitoring performance, selecting drive mode (e.g., sport, comfort, etc.). Controller 912 may also be adapted to communicate with a modem or other wireless communication module 920 for transmitting ride quality data (where locally obtained) to a remote server via an antenna 922. In one arrangement, controller 912 may be configured to continuously characterize ride quality as vehicle 900 traverses over a plurality of road segments based on signals from sensors 914, 916 as well as other sensed variables. In order to index the sensed data with geographic coordinates so that the ride quality data can be associated with particular pre-defined road segments, a location device, e.g., GPS 918, may be coupled to the wireless communication module 920 and/or controller 912.

Figure 10:
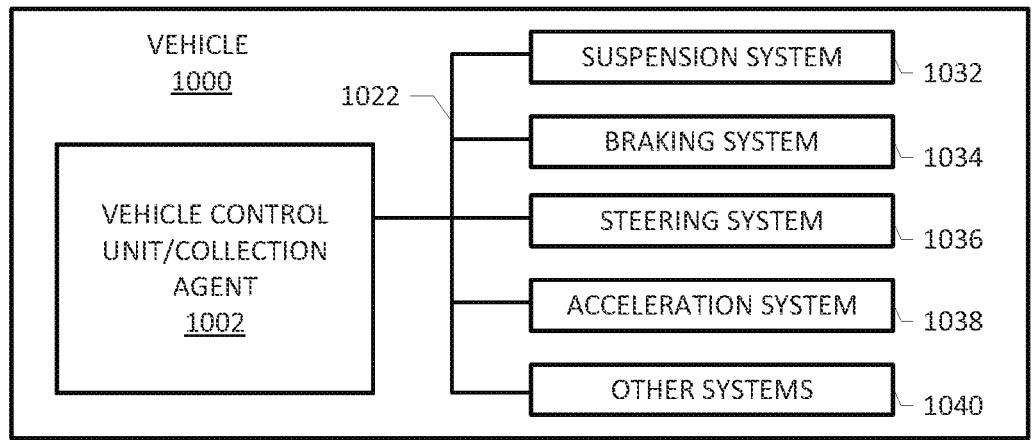
FIGS. 10 and 11 depict block diagrams of components of a vehicle having a collection agent for facilitating highly assisted driving (HAD) according an embodiment of the present patent disclosure.
Figure 11:
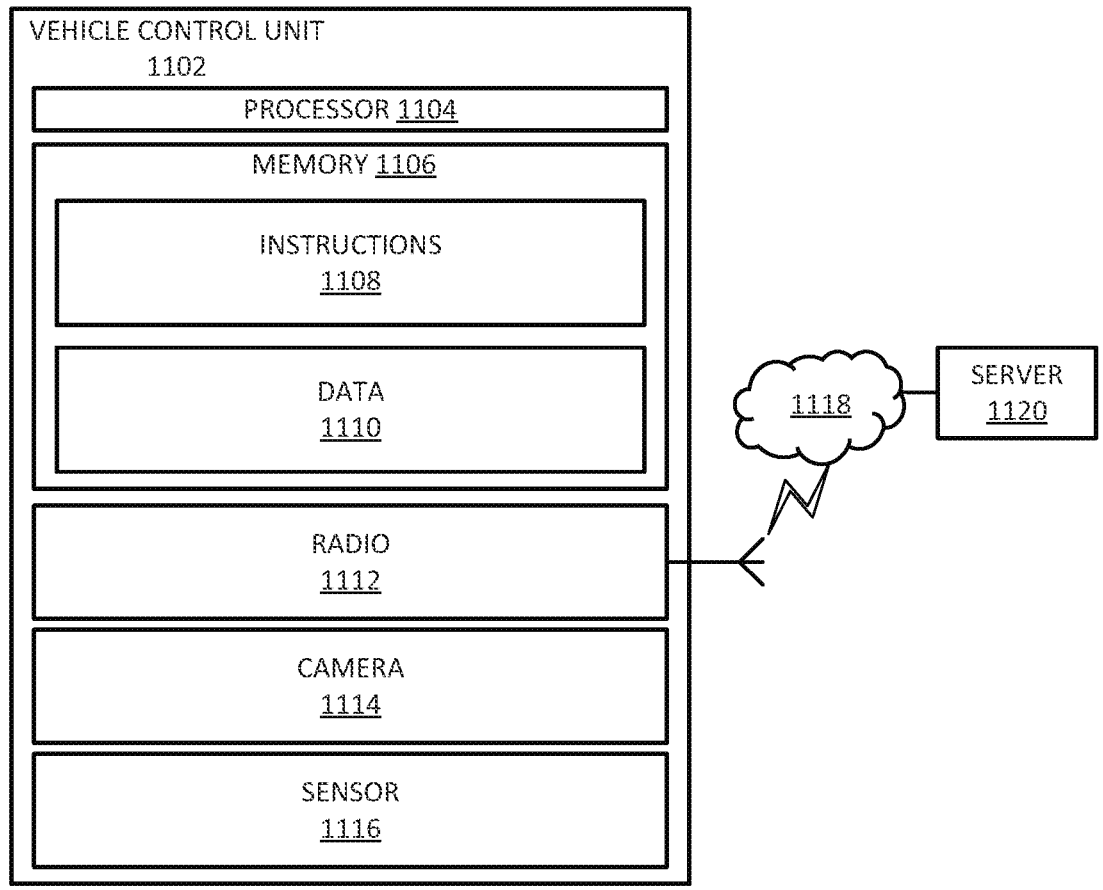

FIGS. 10 and 11 depict block diagrams of components of a vehicle having a collection agent for facilitating HAD/ADAS according an embodiment of the present patent disclosure. Vehicle 1000 shown in FIG. 10 is a representative block diagram of vehicle 900 described above, wherein vehicle control unit and/or collection agent 1002 is operatively coupled via a controller bus 1022 to various vehicular systems such as suspension system 1032, anti-lock braking (ABS) system 1034, steering system 1036, acceleration system 1038 and other vehicular systems 1040. By way of illustration, other vehicular systems 1040 may comprise, and/or be provided as part of, at least one of: adaptive cruise control (ACC) system, automotive navigation system, blind spot monitoring system, collision avoidance system, crosswind stabilization system, human driver monitoring system, forward collision warning system, intersection assistance system, hill descent control system, traction control system, axle sensor system, lane departure warning and lane change assistance system, driving mode system, proximity/parking and obstacle detection system, tire pressure monitoring system, traffic sign and image recognition system, and turning assistance system of the vehicle, and the like.

FIG. 11 depicts additional components, modules, blocks and/or subsystems that may be provided as a vehicle control unit 1102 in a specific embodiment of the vehicle control units 912, 1002 set forth above. As illustrated, vehicle control unit 1102 may include a processor 1104, memory 1106, radio 1102, camera(s) 1114, and sensors 1116. Memory 1106 of vehicle control unit 1102 is operative to store information accessible by processor 1104, including program instructions 1108 that may be executed by the processor 1104. Memory 1106 may also include data 1110 that may be retrieved, manipulated or stored by the processor 1104. As noted previously, the memory may be of any type of tangible media capable of storing information accessible by the processor, such as a hard-drive, memory card, ROM, RAM, DVD, CD-ROM, Flash, etc. Sensors 1116 may include sensors for detecting pitch, yaw, or roll of vehicle 1102. Also, sensors 1116 may comprise a laser scanner, sonar, radar, Lidar, or another similar device for detecting obstacles and/or range detection in general. Camera(s) 1114 may be one or more cameras for taking pictures of the surroundings of vehicle 1102 (front view, rear view, side views, top view, 360-degree view, etc.), which may be used to detect road irregularities, road blocks, traffic lanes, other vehicles, pedestrians, and other environmental information, as noted previously. Radio 1112 may comprise a wireless device operative to effectuate short-range and/or long-range radio communications using any known or heretofore unknown radio communications technology, for receiving and transmitting information. Radio 1112 may be connected to a server 1120 (e.g., operative as an edge compute location) over a wireless network 1118. Broadly, it will be recognized that vehicle control unit and/or collection agent 912/1002/1102 set forth above may be configured to generate, sense, determine, or otherwise obtain various pieces of vehicular condition data and vehicular navigation data from the various vehicular systems in conjunction with the sensors described herein. As described in detail hereinabove with respect to the network-assisted scanning system embodiment of FIGS. 3A-3C, edge compute server 1120 may store information that may be used by the vehicle control unit 1102, whether in autonomous mode or under human supervision. Such information may include HD maps, information about other vehicles' trajectories, road conditions, climate conditions, and so forth, which may be presented in one or more AR/MR displays.

Figure 12:
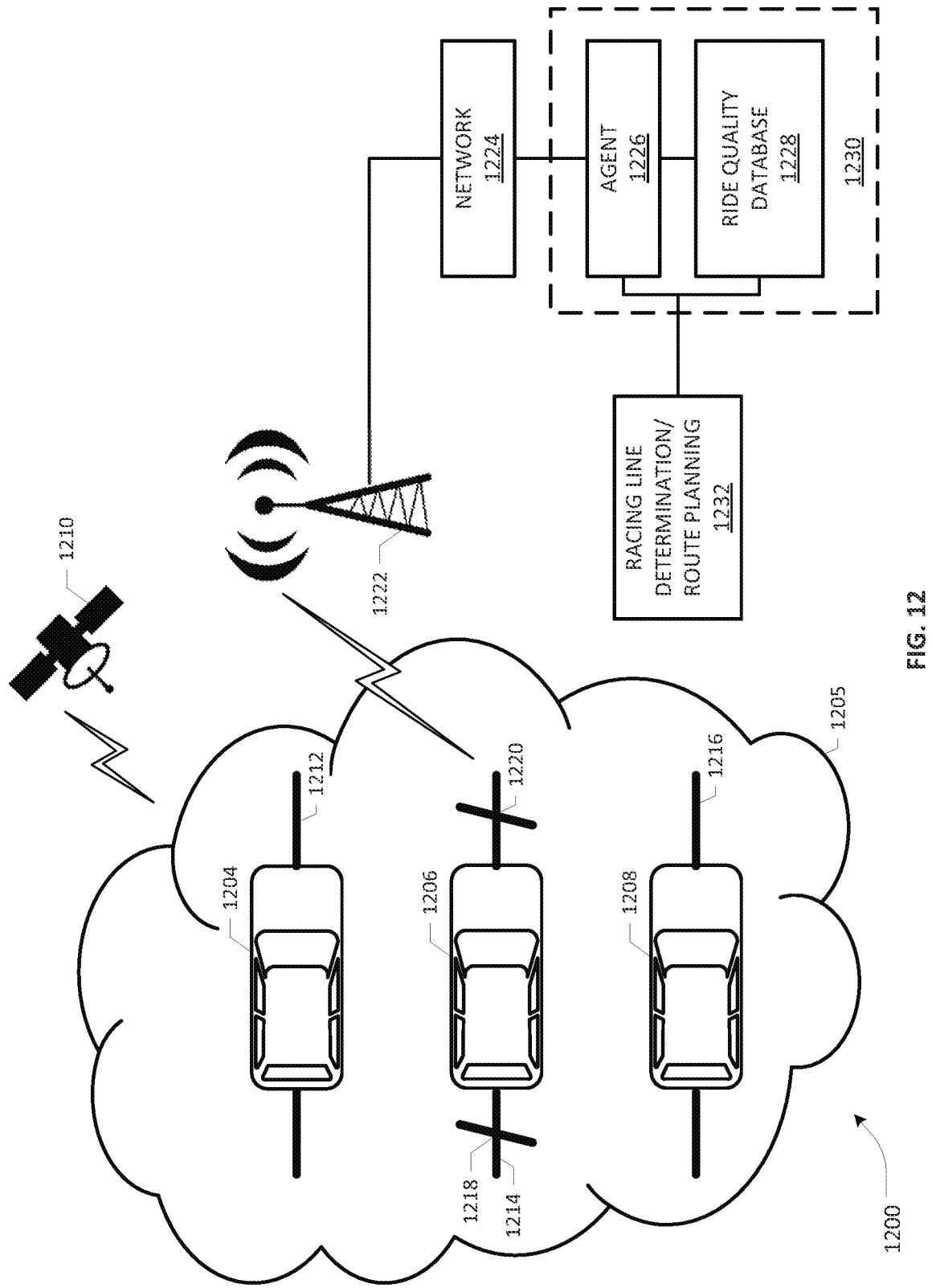
FIG. 12 depicts an example geographical region/area having a road network traversed by a plurality of manual/autonomous vehicles operative to collect and process environmental sensory data in accordance with the teachings of the present patent disclosure.

FIG. 12 depicts an example geographical region/area 1205 having a road network 1212, 1214, 1216 traversed by a plurality of manual/autonomous vehicles 1204, 1206, 1208 operative to collect environmental data in accordance with the teachings of the present patent disclosure. As illustrated, vehicle 1206 is traversing a road segment 1214 having end points at 1218 and 1220, for example. In one arrangement, vehicle 1206 is operative to monitors signals from GPS satellite network 1210 to determine the geographic position of vehicle 1206 and ascertain the identity of road segment 1218. Similarly equipped vehicles 1204 and 1208 traversing different road segments 1212 and 1216 may likewise gather ride quality data and other sensory data which may be indexed with respective geographic coordinates also obtained by monitoring GPS satellites 1210 and then remotely uploaded to a crowd-sourced data repository (e.g., at respective edge node compute locations).

For providing communication with respect to vehicles 1204, 1206, 1208, a wireless cellular network including one or more cell sites 1222 may be provided in a manner similar to the arrangement shown in FIG. 6 described hereinabove. A data network 1224 is operatively coupled to a server platform 1230, which may include a supervisory agent 1226 embodied as a CDS as well as a ride quality/obstacle database 1228. A route planning function 1232 utilizes the ride quality/obstacle data from server 1230 in order to identify the ride quality or comfort level associated with various potential routes or racing line paths available to a vehicle, e.g., vehicle 1206, between the endpoints 1218, 1220 of the road segment 1214. Whereas the route planning function 1232 may be integrated or otherwise associated within as part of server 1230, it may also be located on-board an individual vehicle (e.g., thick client application), or performed by other servers or resources as part of a navigation service provided to subscribing drivers, for example.

Figure 13A:
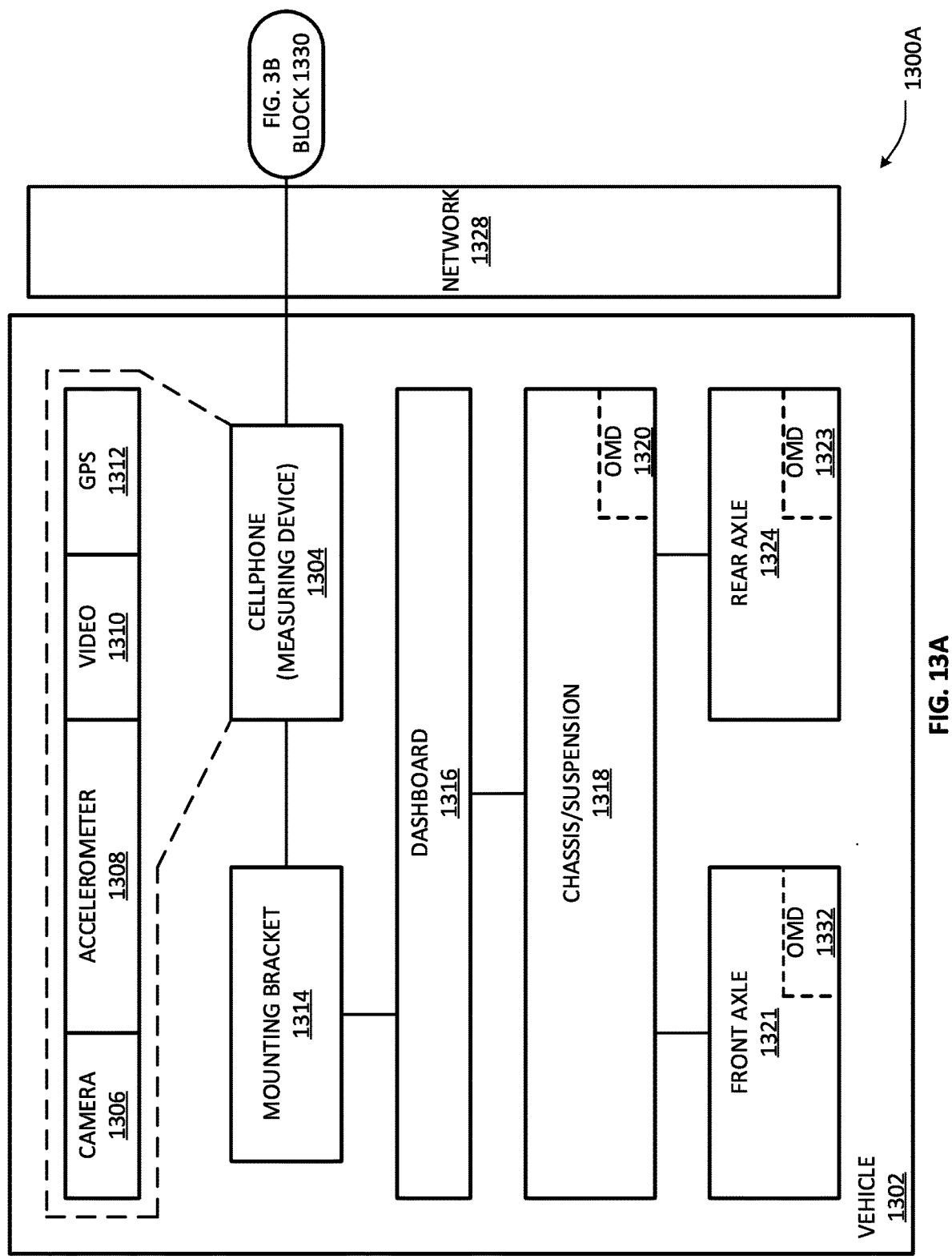
FIGS. 13A and 13B depict a functional block diagram illustrative of various components, blocks, modules, network elements and/or apparatuses that may be configured as a system operative in association with the network architecture of FIGS. 3A-3C for facilitating highly assisted driving based on up-to-date environmental data according to one embodiment.
Figure 13B:
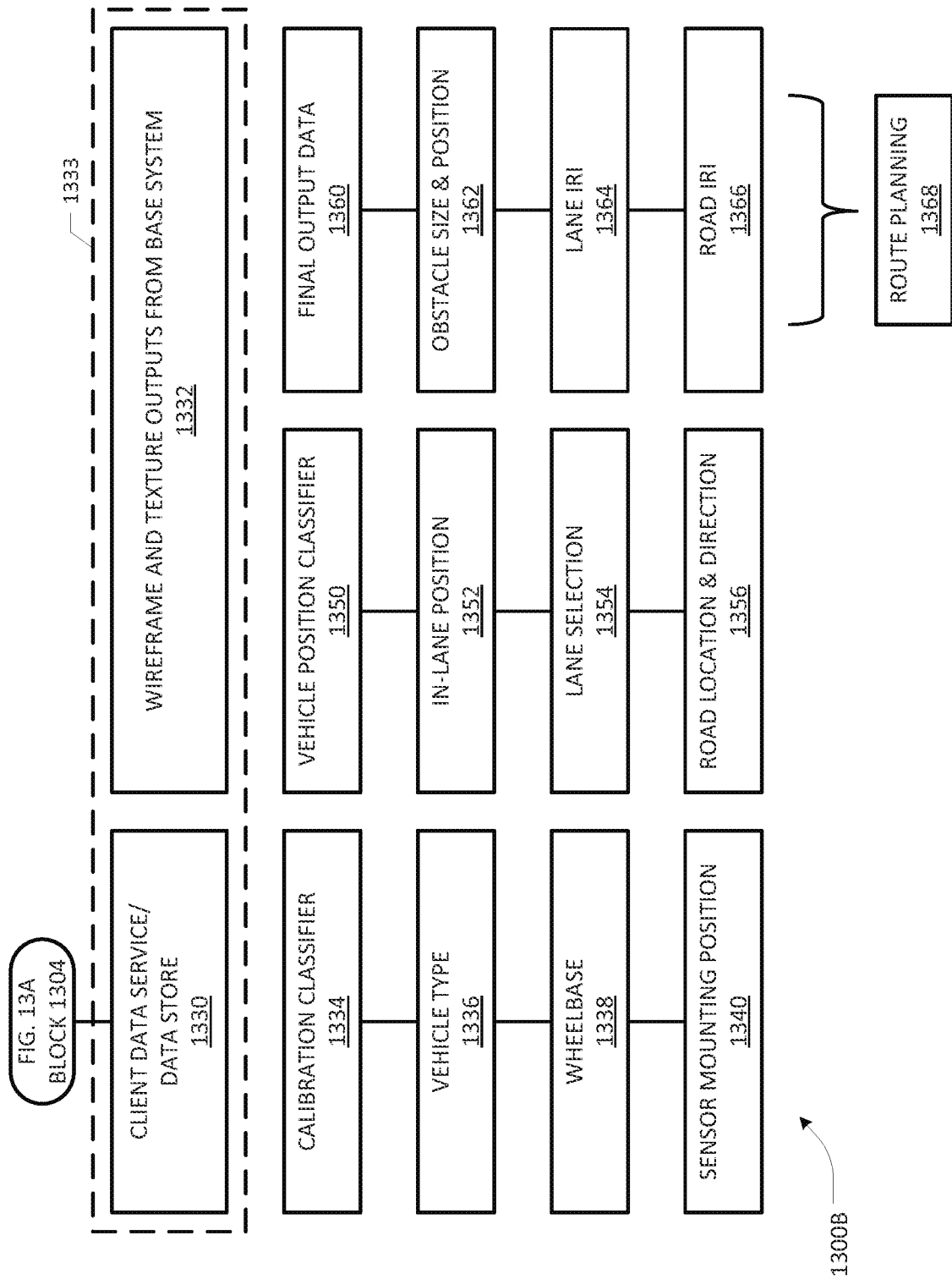

Turning to FIGS. 13A and 13B, depicted therein are portions of a functional block diagram illustrative of various components, modules blocks, network elements and/or apparatuses similar to the foregoing embodiments that may be configured as a system 1300A/B operative in association with the network-assisted scanning architecture of FIGS. 3A-3C for facilitating highly assisted driving based on up-to-date environmental data according to one arrangement. A vehicle 1302, exemplary of vehicles 900, 1000, 1204-1208 described above, is provided with a data collection point, e.g., a cell phone, operative as a measuring device 1304, as illustrated in portion 1300A. Sensors/systems such as camera 1306, accelerometer 1308, video 1310 and GPS 1312, may be associated with the measuring device 1304. Additionally, optionally and/or alternatively, the cell phone inputs can be substituted with optional monitoring devices (OMDs) built into the car at various locations, e.g., OMD 1320 associated with chassis/suspension 1318, OMD 1321 associated with a front axle 1322, OMD 1323 associated with a rear axle 1324, and the like. Generally, the measuring device 1304 may use a fixed mount 1314 to the vehicle 1302, e.g., at dashboard 1316 or windshield, positioned so that it can observe the road ahead as well as the surrounding vicinity depending on the range of the sensory equipment. It will be seen that such placement/layout of sensors and/or measuring device can simplify an example calibration classifier process, responsive to various pieces of vehicular condition data and/or navigation data, as will be described in detail below.

Data transfer may be effectuated via a network 1328, whereby a base system as described above may process the sensory/environmental data to determine the vehicle's AR position with respect to a road segment and/or surrounding vicinity. A simplified example base system 1333 is illustratively shown in portion 1300B as comprising a CDS/database 1330 as well as AR-facilitating data e.g., wireframe/texture output 1332. Once the vehicular AR position is determined, the detail of which is significantly higher than GPS alone, the vehicle's direction and location can be determined on the lane or even at within-lane level, as part of a vehicle position classifier block 1350. In one arrangement, vehicle position classifier block 1350 may also interoperate with or otherwise include in-lane position block 1352, lane selection block 1354, and road location and direction block 1356. This data can then be used to determine the vehicle's wheelbase. Further, the incidence of encountering localized road conditions (e.g., lane width indicators, well-known irregularities, bumps, etc.) may be utilized to infer when one side of the vehicle has encountered the irregularity, giving a width estimate. Likewise, the time between two spikes due to bumps on the road may be utilized to estimate the length of the wheelbase, e.g., depending on sensor locations on the axles, suspension dampers, etc. It should be appreciated that in one configuration, many samples/measurements may be taken and adaptively processed (e.g., in conjunction with known databases) to obtain highly reliable inferences. For instance, the vehicle type can be inferred by comparing the impact of the road irregularities compared to other known vehicles. By way of illustration, suppose a given pothole is identified, has a known position, and has a normalized accelerometer reading of 5 (an arbitrary value). A sports car hitting that pothole may read a higher value (e.g., a reading of 8) because of the tighter suspension, while a family SUV might only be a value of 3 (i.e., a lower reading). Identifying the vehicle type therefore allows for comparison between readings from different vehicles, which can provide a rough indication of the suspension type, which in turn is an indicator of the vehicle size, weight and type. An example calibration classifier block 1334 is therefore operatively associated with vehicle type determination block 1336, wheelbase estimation block 1338 and sensor position block 1340.

Additionally, as noted above, the vehicle's position is also classified or determined in conjunction with the AR data by vehicle position classifier 1350. At the lowest fidelity source, the system can provide at a minimum the road location and direction. However, by using AR positioning data, an example embodiment of the system 1300A/B can be configured to deduce not only which lane but also what part of the lane the recording/reporting vehicle is traveling in. The two data sources—vehicle type and position—output by calibration classifier 1334 and vehicle position classifier 1350 can then be used to normalize the data into a plurality of output buckets for further analysis. In one example arrangement, one data output may comprise or relate to the determination of the obstacle size and position. A second data output may comprise or relate to a probability distribution for the obstacle's location in the AR world surrounding the vehicle. A third data output may comprise or relate to a depth map determination of the expected displacement (e.g., depth/height or other contours) of the irregularity. In a further embodiment, the system 1300A/B may be configured to calculate or contribute to a lane-specific International Roughness Index (IRI), a standardized measurement of the roughness of a stretch of road, including parts thereof, as well as a general road IRI. As exemplified in FIG. 13B, an output data block 1360 of the system portion 1300B therefore is illustratively interfaced with obstacle size determination 1362, lane IRI determination 1364 and road IRI determination 1366.

According to the teachings of the present patent application, a route planning module 1368 (e.g., roughly analogous to the module 1232 shown in FIG. 12 described above) may be configured to receive the foregoing data outputs (i.e., pertaining to road smoothness/roughness, ride quality, etc.) for further analysis with respect to determining an optimal racing line path for the vehicle 1302. Depending on what/who the consumption point is and/or what the data is used for, whether subscription-based or not, etc., different modalities may be implemented in an example arrangement. For general route planning, module 1368 can be configured to calculate, determine and or otherwise estimate the "smoothest" route taking into account vehicle length. It should be appreciated that this determination would be particularly advantageous, for example, for fleet planning when options are available to reduce the vehicle operating cost. For human-based navigation, route planning module 1368 may be configured to provide lane recommendations (e.g., "stay in this lane for X miles, then switch to the one to the right"), where it is legal to do so. The system may also be configured to provide recommendations on which parts of the lane may be smoother, when it may be a good idea to slow down to avoid the impact of a larger bump, and, for slower or country roads, how to navigate the road to avoid large and potentially dangerous obstacles. For autonomous driving mode, the system may be configured to provide a high fidelity topographical map (e.g., accurate to within inches) in addition to the road map, allowing the vehicle to perform various self-smoothing operations, e.g., adjust suspension, take corrective action (e.g., if possible without interfering with other vehicles) or adjust speed, etc. Moreover, the map data can also be used to make predictive adjustments on in-vehicle displays, e.g., correct for a road bump in an AR display.

Figure 16:
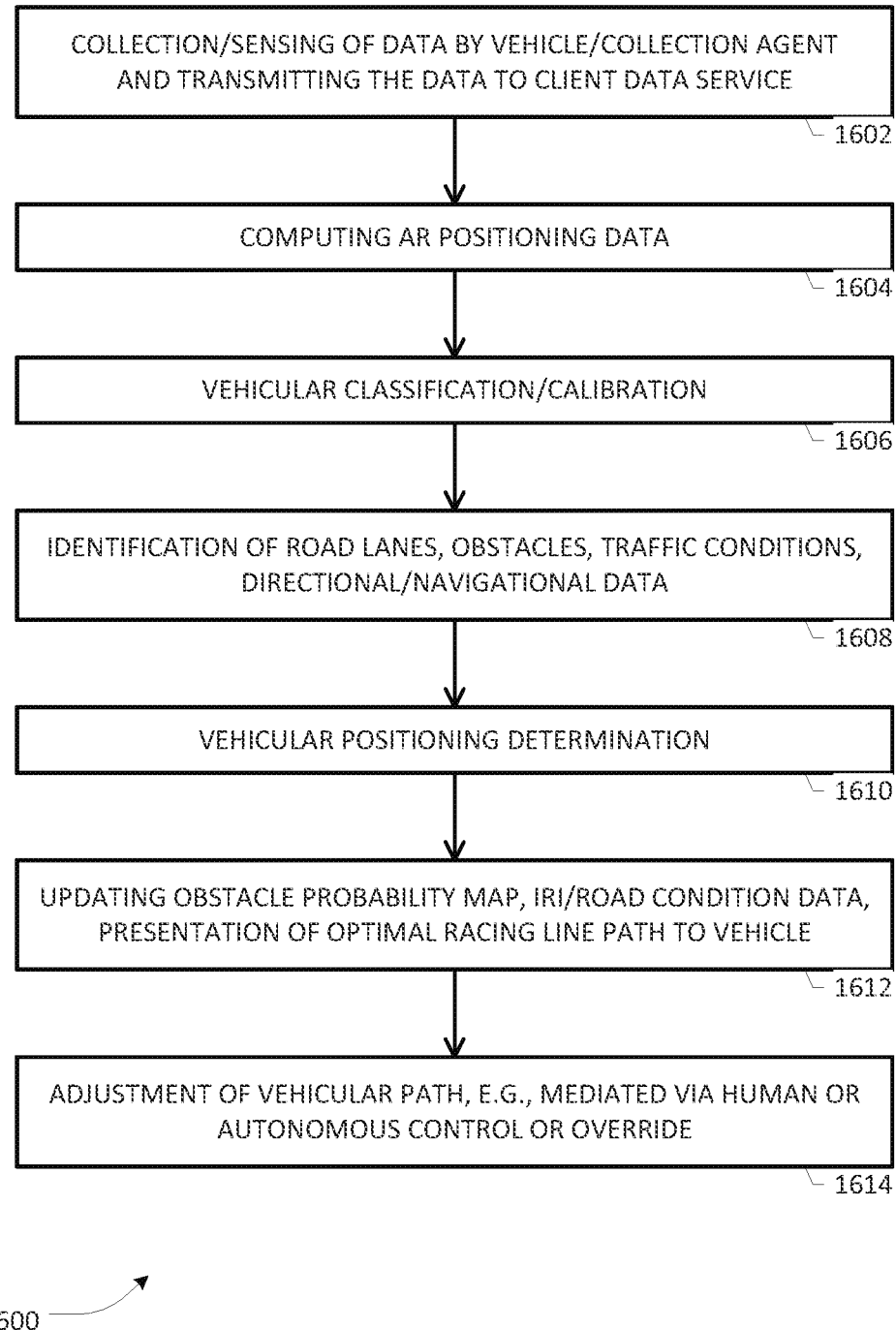
FIG. 16 is a flowchart of various blocks, steps and/or acts that may be (re)combined in one or more arrangements, with or without additional flowcharts of the present disclosure, for facilitating a process in association with the system of FIGS. 13A-13B according to an embodiment of the present invention.

FIG. 16 is a flowchart of various blocks, steps and/or acts that may be (re)combined in one or more arrangements, with or without additional flowcharts of the present disclosure, for facilitating a process 1600 operative in association with the system of FIGS. 13A-13B according to an embodiment of the present invention. At block 1602, data is collected and/or received by a vehicle collection agent, and/or in association with monitoring devices and sensors, if any. The collected/received data may be transmitted to a CDS, e.g., either immediately or at some scheduled point. An embodiment of a base system as described in detail hereinabove computes, calculates or otherwise determines AR positioning data in suitable data formats (block 1604). The vehicle type may be classified, calibrated, either based on vehicle known data (e.g., from on-board sensors) and/or based on the handling of the vehicle and estimated vehicle parameters (e.g., wheelbase, etc.), as set forth at block 1606. Road lanes, road conditions, vehicle lane position and direction are determined or otherwise obtained at block 1608. Using the foregoing pieces of data, a calculation or determination is made for obtaining a fairly accurate vehicle location, velocity (e.g., difference between two locations), etc., which may be normalized based on the vehicle class/type determination (block 1610). Normalized data may be used for updating obstacle probability maps, IRI and road condition data, etc. As noted above, an optimal racing line may also be computed, determined or otherwise estimated, e.g., for presentation in AR/VR/MR-friendly display (block 1612). Depending on the control modality, the vehicle's routing/motion may be adjusted responsive to the racing line characteristics, e.g., via autonomous control and/or manual override (block 1614).

Skilled artisans will recognize that it is not always necessary for the vehicle to send the data to a network node in an example embodiment of the foregoing process. For instance, two modes may be provided depending on power management, e.g., to conserve power. First, the vehicle/collection agent can record but not send data until and unless a sensed parameter's values (e.g., the accelerometer readings) exceed certain thresholds. At that point, it can send a historical record that helps find the irregularity. In another embodiment, a deeper power saving mode (i.e., second mode) can avoid recording outside of locations where there is not a known and identified need for more data, and only trigger a notification on the identification of a road irregularity. As there is no recording of the area, this will only leave a marker on the server to request that a later vehicle indeed scans this area (e.g., by a dedicated probe vehicle or other vehicle having the collection agent functionality).

Figure 15:
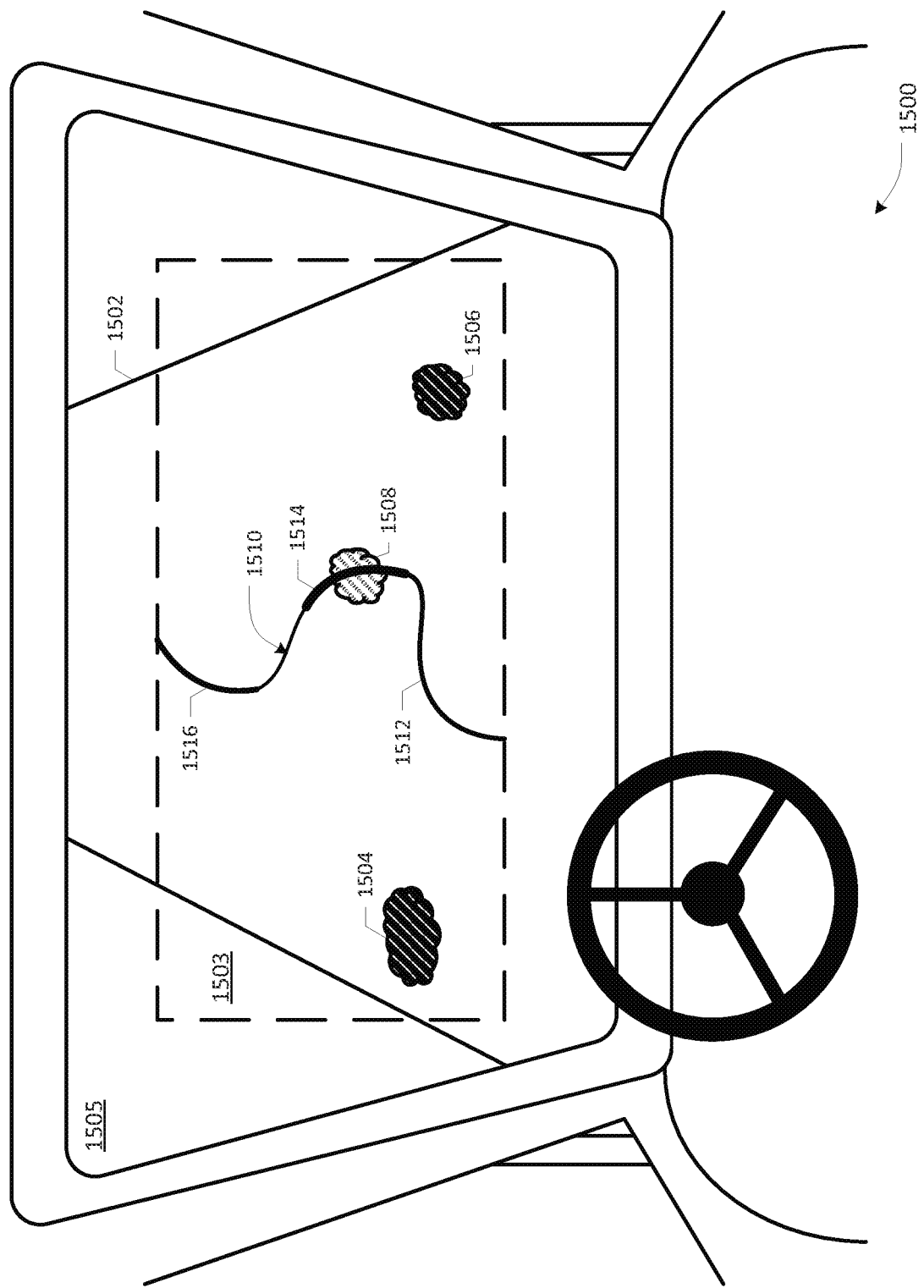
FIG. 15 is illustrative of a vehicle with AR display for showing a routing path or racing line presented based on up-to-date environmental data according to an embodiment of the present invention.

FIG. 15 is illustrative of a vehicle 1500 with AR display capability for showing a routing path or racing line presented based on up-to-date environmental data according to an embodiment of the present invention. A windshield 1505 of vehicle 1500 offers a human driver a view of a road 1502 on which the vehicle is traveling. A plurality of obstacles, e.g., potholes, 1504, 1506, 1508, may sensed by a network-assisted scanning and processing system of the present invention (e.g., system 1300A/B of FIGS. 13A-13B). Responsive thereto, and based on vehicle calibration and navigation data, an optimized racing line 1510 may be presented in an AR field of view 1503 virtually superimposed on or visible though the windshield 1505. In one arrangement, the racing line 1510 may be comprised of different segments 1512, 1514, 1516, which may be of different thicknesses, different color-coded portions, and the like, that can be configured to indicate different vehicular performance conditions and parameters, e.g., speed, suspension/bumpiness, etc. Although such a simulated AR racing line may be presented as a highly assisted driving aid to help a driver safely navigate a road with uneven surfaces and obstacles, a driver (human or automaton) may or may not act on that information, depending on the road size and speed. Further, an example embodiment may present more information or less information e.g., graphics, in an AR view, depending on road/driver/climate conditions, so as to minimize distraction.

It should be appreciated that the terms "augmented reality" or "AR" and "mixed reality" or "MR" may be used somewhat interchangeably for purposes of an embodiment of the present invention. Further, where only "AR" or "MR" is mentioned, it will be realized that these terms represent both AR and MR, cumulatively or otherwise. In the context of the present patent disclosure, augmented reality (AR) is a technology where the real world and its physical objects, images, senses, sounds, and other tangible quantities in a physical environment that is viewed, sensed, heard, or otherwise perceived by a user using a suitable display/device and other related hardware is augmented or supplemented with or by virtual objects or other computer-generated sensory input such as sound, video, graphics, olfactory and tactile sensory data, as well as suitable GPS/mapping data in ambient-assisted mobility/navigation cases. In a general sense, AR may be an overlay of content on the real world, but that content may or may not be anchored to or part of the physical view or its objects. On the other hand, virtual reality (VR) uses computer technology to create a simulated environment in which the user/consumer/subscriber is completely immersed in the simulated experience. In a virtual reality environment, all the visuals are digitally produced and there is typically no interaction with the real world. More broadly, embodiments of the present invention may treat mixed reality (MR) as a mix of AR and VR, sometimes also referred to as "hybrid reality" that involves a merging of real and virtual worlds to produce new environments and visualizations where physical and computer-generated objects, sounds, images, etc. (collectively, "entities") may coexist and even interact in real time. In other words, MR can be considered an overlay of synthetic entities or content on the real world environment that are anchored to and interact with the physical objects/entities therein in some meaningful fashion. Thus, in an MR environment, an embodiment may not only allow for the merger of digital objects within a real world scenario but also facilitate extra real life textural, tactile, olfactory, visual, aural, or other sensory feedback such as "depth" or "surfaces" or "texture", and the like.

Turning to FIGS. 14A-1 to 14A-3, 14B and 14C, depicted therein are flowcharts or portions thereof having various blocks, steps and/or acts that may be (re)combined in one or more arrangements, with or without additional flowcharts of the present disclosure, for illustrating additional details with respect to the system of FIGS. 13A-13B. One skilled in the art will recognize that processes 1400A-1 to 1400A-3, 1400B and 1400C shown in FIGS. 14A-1 to 14A-3, 14B and 14C may be executed at a network node in combination with a network-assisted scanning system and CDS (e.g., edge network and/or a cloud-based compute location), although other arrangements are also possible, e.g., with distributed control involving client-side functionality. Upon commencing as set forth at block 1402 of process portion 1400A-1 in FIG. 14A-1, which may be responsive to an input from a base system and/or data transfer from a collection agent, for example, a determination may be made whether calibration is needed (block 1404). If so, a further analysis may be performed as to whether automatic calibration or user-mediated calibration is required, as set forth at decision block 1406. At block 1408, a user query process is engaged for saving calibration data if different (block 1410). Under automatic calibration flow, a determination is made whether the vehicle has on-board calibration (block 1412). If so, factory calibration data may be loaded (block 1414) and saved (block 1410). Otherwise, an iterative calibration process is executed until a sufficient number of data samples have been obtained (block 1416). As part of acquiring calibration data in an iterative process, shown in process portion 1400A-3 of FIG. 14A-3, input data relating to, e.g., accelerometer, timestamp, geolocation, etc. may be fetched or otherwise received from a node, e.g., a base system database (block 1420). If a condition relating to an anomaly is detected (block 1422), it is identified and characterized in reference to the vehicle location and performance parameters (block 1426). For example, velocity at impact, anomaly vector compared to gravity minus noise, etc., may be determined. Subject to or conditional upon a threshold evaluation, if a determination is made that an anomaly is not present in reference to the reported location (block 1430), the flow control returns to input data retrieval 1420 in an iterative loop. Likewise, if an anomaly condition is not detected at block 1422, vehicular parameters relating to velocity, aggregate accelerometer readings, gravity vector, etc. may be determined as per normal navigation (block 1424), whereupon the flow control returns to input data retrieval block 1420 as well.

On the other hand, if an anomaly is determined to exist (decision block 1430), anomaly data may be processed as set forth at block 1432, which output may be provided to a number of sub-processes with respect to sample vehicle type, vehicle wheelbase sampling, sensor mounting position sampling, as set forth at blocks 1434, 1436 and 1438, respectively. Thereafter, the flow control may return to decision block 1416 in an iterative loop until the calibration process is complete.

After a sufficient amount of calibration data has been obtained, it may be summarized and applied to any data samples gathered (block 1418). Any remaining data samples may be uploaded (block 1419) and saved (block 1410).

It should be appreciated that calibration can occur during many stages, as a background process or conditioned upon an event and/or user input, such as, e.g., after the accelerometer encounters an impossible event (e.g., gravity turning upside down). As a background calibration process, the foregoing iterative loop involving blocks 1416-1438 may be implemented in an example arrangement. As to a conditional calibration case in one scenario, this could be in response to the mobile phone possibly being picked up by a user, dropped or moved, etc. It is possible for a user to change (intentionally or not) the mounting position of a phone, or even take it with him while changing vehicles, or replace the phones. A (re)calibration can therefore be executed substantially similar to the foregoing iterative process, as exemplified by blocks 1448, 1450, 1452, 1454 and 1456 of process portion 1400A-2. Accordingly, a calibration process may go back and forth between a background calibration process and a conditioned (re)calibration process depending on the situation.

Upon user selection 1440, the process flow may exit (block 1442), or may selectively lead to one or more assisted-driving processes such as, e.g., steering guidance 1444, route guidance 1446, among others, similar to the embodiments as described previously. An example route guidance process 1400B in further detail is set forth in FIG. 14B as an embodiment of block 1446 of portion 1400A-2 of FIG. 14A-2. Likewise, a flowchart with additional details relating to an example steering guidance process 1400C is set forth in FIG. 14C as an embodiment of block 1444 of portion 1400A-2. Upon starting (block 1460), guidance process 1400B involves obtaining destination address information, e.g., street, postal, GPS. latitude/longitude, or other coordinates, etc. (block 1462), as well as a vehicle profile (block 1464), which are provided to a server (block 1466). A search loop, which may typically last until either a configurable search time has been exceeded or a desired number of suitable routes have been found, may be initiated at a block 1468. Initially, a new/potential candidate route is created, designated or identified (block 1472) for which expected smoothness/roughness/comfort level may be determined (block 1474). In one arrangement, the smoothness profile may be adjusted according to the vehicle profile (block 1476). A determination may be made as to whether an intended/desirable level of smoothness/comfort level has been met (block 1478). If not, the flow control loops back to the search initiation block 1468. On the other hand, if the candidate route has a requisite level of smoothness/comfort level as per decision block 1478, the route is prepared, including but not limited to lane recommendations, surface irregularities, etc. (block 1480). Thereafter, the prepared route is added to a route list (block 1482), whereupon the process flow returns to the search initiation block 1468 for next iteration. When the search loop is done or otherwise exited, the found routes may be provided to the vehicle (block 1470) via an interface as part of display guidance relative to a map (block 1484). If no routes have been found, a suitable message may be provided instead.

Figure 14C:
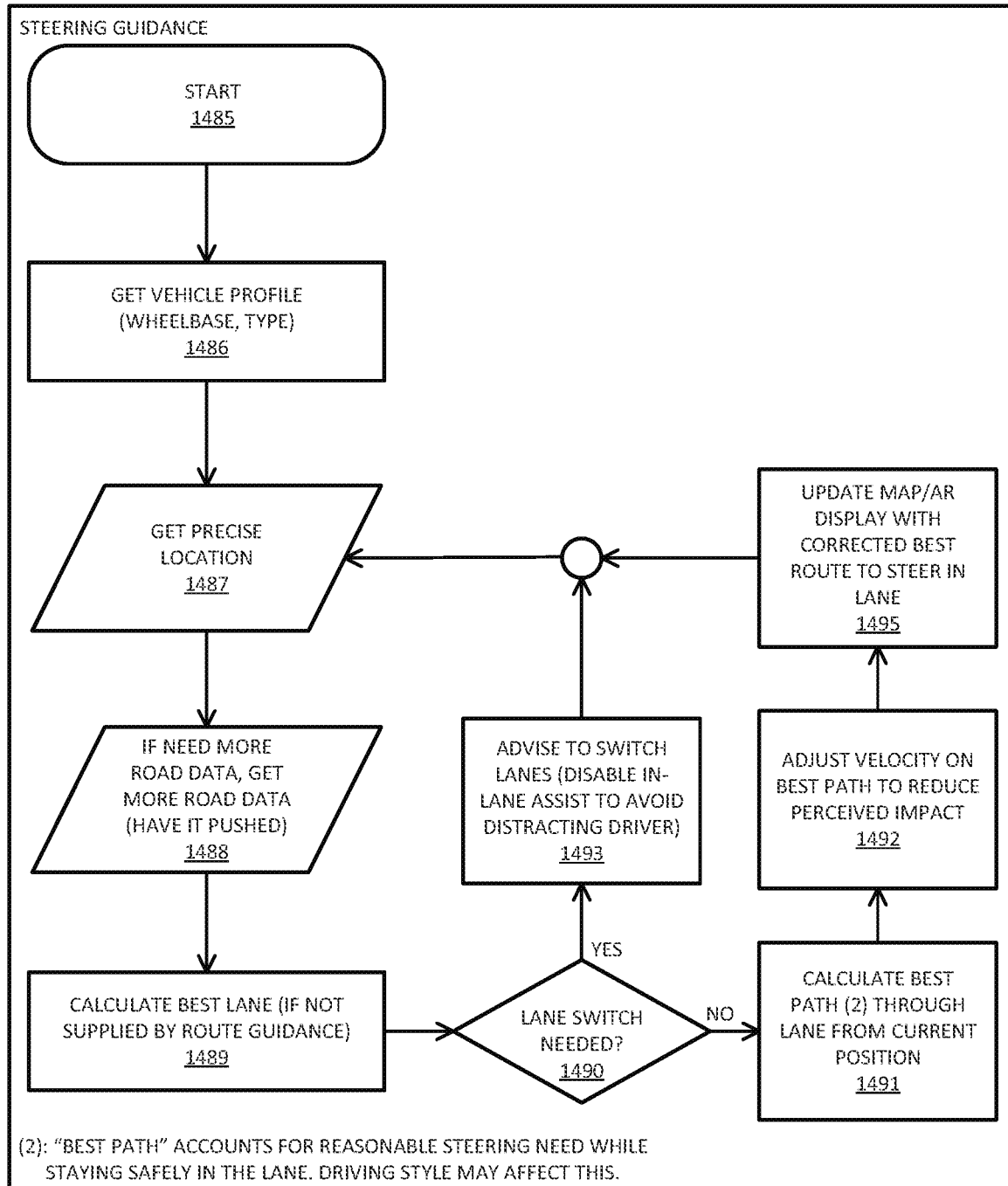

Turning to FIG. 14C, steering guidance process 1400C commencing at block 1485 proceeds to obtain a vehicle profile (block 1486). A precise location of the vehicle is obtained (block 1487), e.g., from a base system as pointed out previously. If more road data is needed, that information may be provided via a suitable mechanism (e.g., push mechanism), as set forth at block 1488. A best lane may be calculated, obtained or otherwise determined (e.g., if not supplied by a route guidance process), as set forth at block 1489. If a lane change is needed (block 1490), an advisory message to switch lanes may be provided (block 1493). In one arrangement, in-lane assist service may be disabled so as to reduce or avoid distracting the human driver. If lane switch is not needed, a best path through the determined lane is calculated or otherwise determined (block 1491), whereupon velocity with respect to the determined best path may be adjusted/corrected so as to reduce perceived impact (block 1492). A route map and associated AR display view may be updated to show the corrected best path to steer in the determined lane (block 1495). In one arrangement, output from lane change advisory message block 1493 and/or map update/AR display block 1495 may be provided to the vehicle location determination. In a further arrangement, "best path" determination may be modulated based on driving styles, while continuing to apply a set of constraints to ensure reasonable steering in order to stay safely in the lane. One skilled in the art will recognize the foregoing guidance/steering processes may also combined into a combination HAD process, and/or may be integrated with other assisted-driving processes. Skilled artisans will further recognize that a quicker initial setup may be facilitated with respect to the process portions 1400A-1/1400A-3 wherein blocks 1402-1438 may be replaced/augmented by a "generic" or "average" or "default" vehicle profile, and starting directly at user selection block 1440 in process portion 1400A-2 and using calibration in the background (albeit with reduced accuracy for the user).

Figure 7:
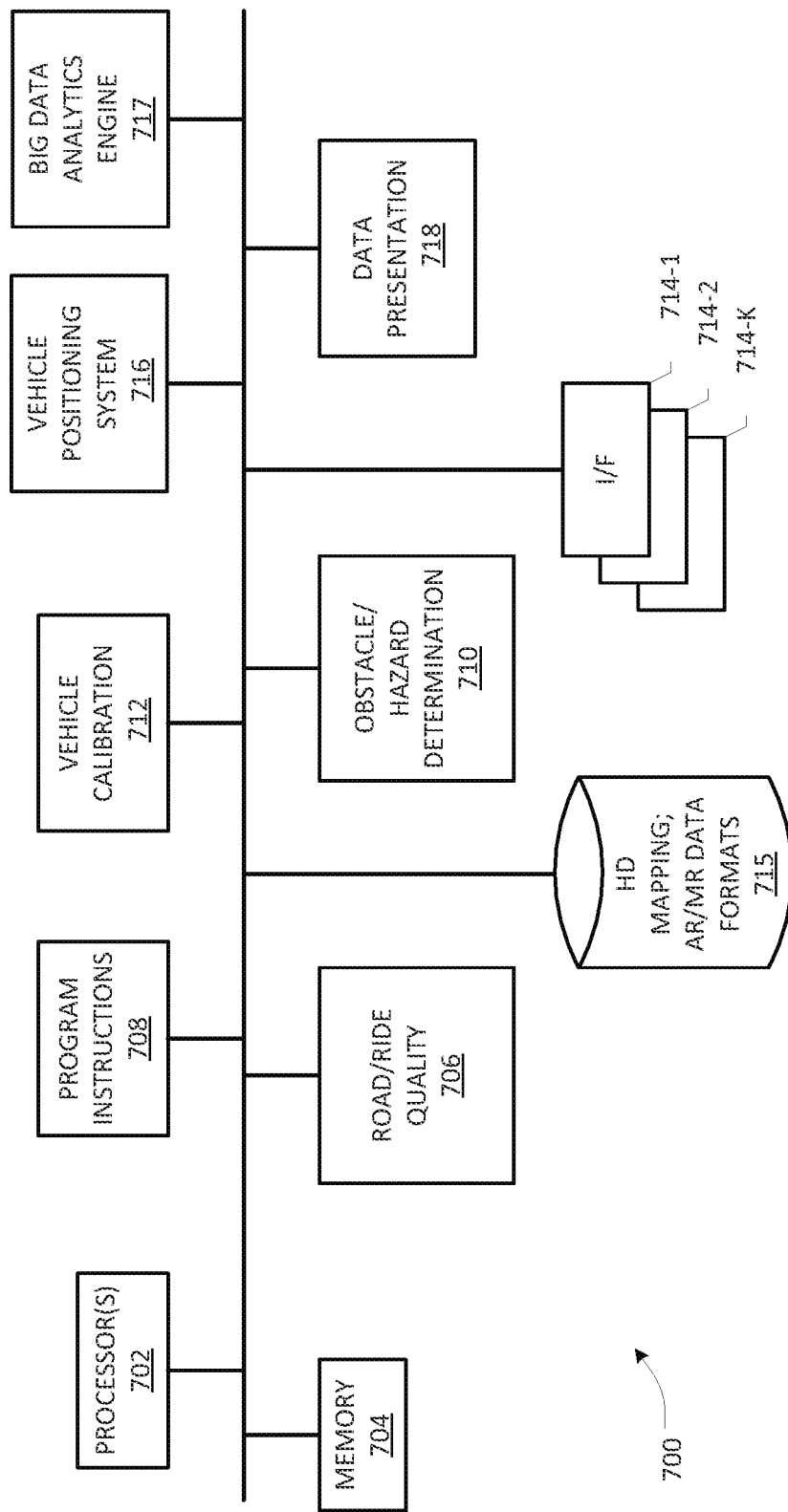
FIG. 7 depicts a block diagram of a computer-implemented apparatus that may be (re)configured and/or (re)arranged as a platform, node or element at an edge network location, a core network location, and/or a cloud-based datacenter location according to an embodiment of the present patent disclosure.

Turning now to FIG. 7, depicted therein is a block diagram of a computer-implemented apparatus 700 that may be (re)configured and/or (re)arranged as a system, platform, node or element at an edge network location or a datacenter location according to an embodiment of the present patent disclosure. For example, apparatus 700 may be configured in one embodiment as an edge compute location operative to execute the functionality of a base system for facilitating network-assisted scanning as set forth above. In another configuration, apparatus 700 may be implemented as a cloud-based datacenter compute location interfacing with an edge compute location and/or a plurality of sensing points or collection agents. In an additional or alternative embodiment, apparatus 700 may be configured as a network node operative as at least a portion of system 1300A-1300B for purposes of the present patent application. Skilled artisans will therefore recognize that apparatus 700 may be suitably configured to execute any of the processes, methods, and/or schemes set forth herein. Accordingly, one or more processors 702 may be operatively coupled to various modules that may be implemented in persistent memory e.g., memory 708, for executing suitable program instructions or code portions with respect to one or more processes set forth in the present patent application for facilitating network-assisted scanning, environmental sensory data prioritization, CDS services, 2D/3D HD mapping, AR/MR-friendly data rendering, etc. Furthermore, depending on a particular configuration, a vehicle calibration module 712, a vehicle position/location determination module 716, and obstacle/hazard determination module 710 may be included as part of apparatus 700. A Big Data analysis module 717 may be configured to facilitate various data processing flows with respect to sensed environmental data, and possibly in conjunction with third-party data sources, as well as HAD/ADAS services, highly assisted location-based services, etc. At least for purposes of an embodiment of the present application, "Big Data" may be used as a term for a collection of data sets so large and complex that it becomes virtually impossible to process using conventional database management tools or traditional data processing applications in a scalable manner. Challenges involving Big Data may include capture, curation, storage, search, sharing, transfer, analysis, and visualization, etc. Because Big Data available with respect to user/vehicular activity data, surrounding environment data, etc. can be on the order of several terabytes to petabytes to exabytes depending on the number of subscriber accounts, crowd-sourced collection agent operators, vehicles, and UE devices as well as the vast number of available third-party content sources, it becomes exceedingly difficult to work with using most relational database management systems for optimizing, ranking, correlating and indexing activity data in typical environments. In one embodiment, Big Data analytics platform 717 may be implemented as a programming model framework for processing and generating large data sets with a parallel, distributed algorithmic engine that may be executed in a "massively parallel processing" (MPP) architecture with software running on a large number of servers (e.g., a server farm). For example, a MapReduce programming platform may be configured as an implementation of the analytics service platform, either as part of apparatus 700 or separately associated therewith for analyzing and correlating the data in order to generate data output in suitable formats for AR/MR rendition, 3D maps, etc. In one implementation, an example software/hardware framework may comprise a common set of libraries and utilities needed by other modules, a distributed file system (DFS) that stores data on commodity machines configured to provide a high aggregate bandwidth across the cluster, a resource-management platform responsible for managing compute resources in the clusters and using them in the execution of MapReduce-based programming model. Broadly, an example MapReduce programming platform may include an Input reader component, a Map function component, a partition function component, a compare function component, a Reduce function component and an Output writer component, configured to interoperate with various components, blocks/modules, and/or databases of the example apparatus 700.

A data presentation module 718 may be operative with Big Data analysis module 717 as well as one or more databases storing HD mapping data and AR/MR-friendly data (e.g., database 715) and road/ride quality (block 706) may be provided for facilitating output data transfer to a plurality of consumption agents for purposes of an embodiment of the present invention. Depending on the configuration, various network interfaces (I/F) 714-1 to 714-K may be appropriately provided with respect to effectuating communications with, inter alia, sensing/collection agents, consumption agents, vehicles, smart wearables, smart infrastructure elements/nodes, AR/MR/VR-capable end user devices, edge compute locations, cloud-based datacenters, third-party databases, and the like.

Figure 8:
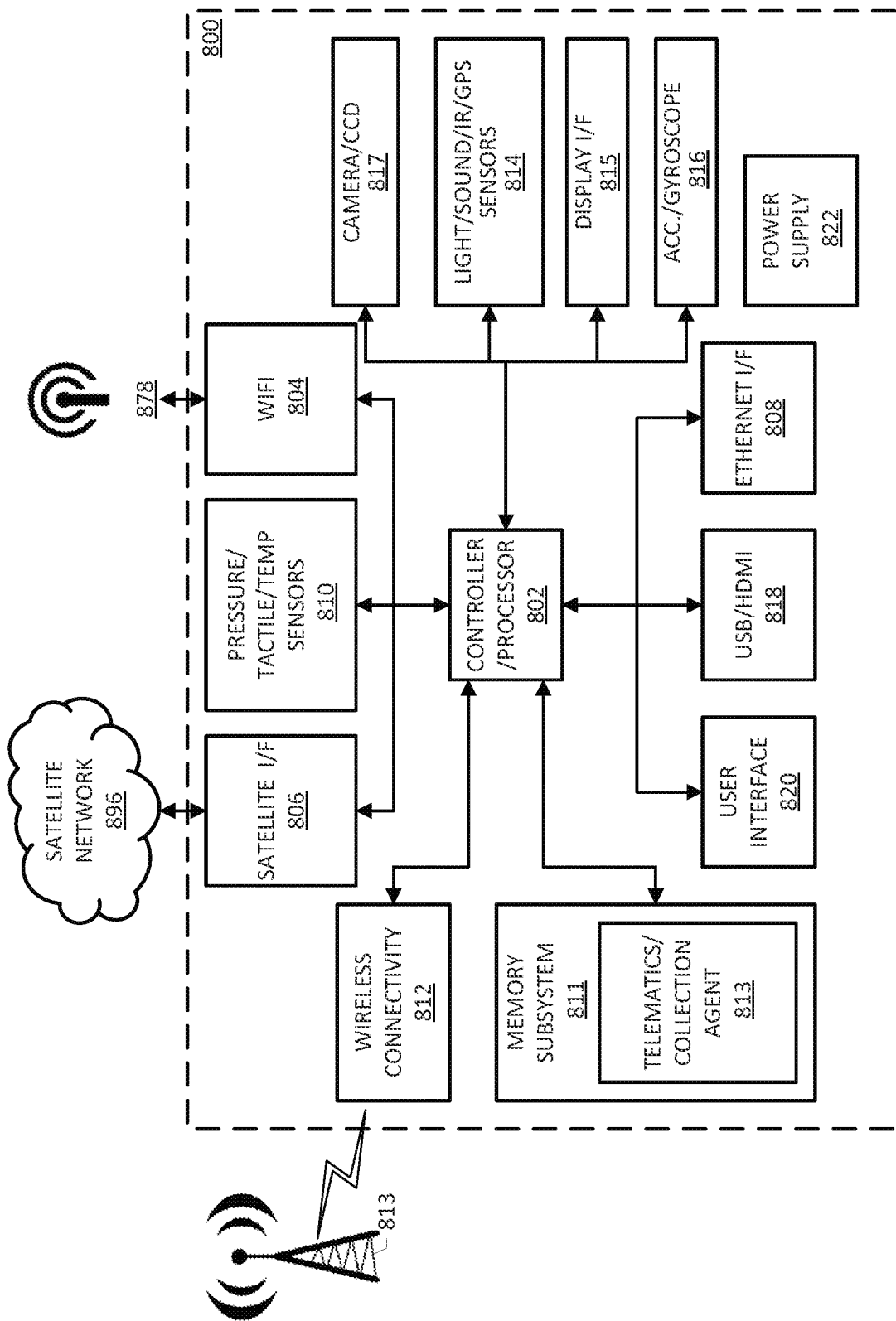
FIG. 8 depicts a block diagram of a user equipment (UE) node having a collection agent according to an embodiment of the present patent disclosure.

FIG. 8 depicts a block diagram of a user equipment (UE) node or system 800 having a collection agent according to an embodiment of the present patent disclosure. UE system 800 may be configured as a collection agent 102-N, a data consumption agent 118-K, a sensing platform 303 and/or operative in association with a vehicle 510-N according to one or more embodiments set forth hereinabove, and may include appropriate hardware/software components and subsystems configured for performing any of the device-side processes (either individually or in any combination thereof) with respect to generating, sensing and reporting various types of environmental data and receiving appropriate output data responses depending on implementation. One or more microcontrollers/processors 802 are provided for the overall control of UE 800 and for the execution of various stored program instructions embodied in a persistent memory 813 as a sensing/collection/consumption agent as well as effectuating telematics sensing and data collection where associated with a manual/autonomous vehicle, as appropriate client-side applications that may be part of a memory subsystem 811 of the UE device. Controller/processor complex referred to by reference numeral 802 may also be representative of other specialty processing modules such as graphic processors, video processors, digital signal processors (DSPs), and the like, operating in association with suitable video and audio interfaces (not specifically shown). Appropriate interfaces such as WiFi I/F modules 804 and satellite network I/F modules 806 involving tuners, demodulators, descramblers, etc. may be included for processing and interfacing with various short-range wireless and satellite communications networks, e.g., as representatively shown at reference numerals 878, 896, respectively. Example sensors may include camera(s)/charge-coupled devices (CCDs) 817, optical/sound/IR/GPS sensors 814, accelerometer/inclinometer/gyroscope 816, as well as pressure, tactile, temperature sensors 810, etc. Additional sensory instrumentation may comprise gesture sensors/controllers, optical scanners, near-field communications (NFC) devices, head movement detectors, ocular movement trackers, face recognition, and directional sensors such as solid-state compasses. Other I/O or interfaces such as a display interface 815, AR/MR interface 820, USB/HDMI ports 818, Ethernet I/F 808, and wide area wireless connectivity interfaces 812 for connecting with suitable RAN infrastructures 813 are also provided. Although not specifically shown, a local storage may be included for storing various raw and/or preprocessed environmental sensory data. UE 800 may also comprise is a suitable power supply block 822, which may include AC/DC power conversion to provide power for the device 800. It should be appreciated that the actual power architecture for the UE device may vary by the hardware platform used, e.g., depending upon the core SoC (System on Chip), memory, analog front-end, analog signal chain components and interfaces used in the specific platform, and the like.

One skilled in the art will recognize that various apparatuses, subsystems, scanning data processing functionalities/applications, HAD/ADAS systems, and/or 3D HD mapping and AR/MR-compatible data rendering functionalities, as well as the underlying network infrastructures set forth above may be architected in a virtualized environment according to a network function virtualization (NFV) architecture in additional or alternative embodiments of the present patent disclosure. For instance, various physical resources, databases, CDS services, applications and functions executing an example network environment of the present application may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of hardware/software associated with the example systems/processes shown in, including without limitation, FIGS. 3A-3C, 4A-4B, 6, 12, 13A-13B and 14A-1 to 14A-3, 14B and 14C, etc. may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Where the phrases such as "at least one of A and B" or phrases of similar import are recited or described, such a phrase should be understood to mean "only A, only B, or both A and B." Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the claims appended below.

The invention claimed is:

1. An apparatus configured for facilitating assisted driving in a vehicle based on geospatial sensing of an environment in which the vehicle is disposed, the apparatus comprising:
   one or more processors; and
   one or more persistent memory modules having program instructions stored thereon which, when executed by the one or more processors, perform following acts:
      receive environmental data from one or more collection agents, each operating with a plurality of sensors configured to sense data relating to the environment, wherein at least one collection agent is integrated with the vehicle for providing vehicular condition data and vehicular navigation data;
      obtain road condition information and obstacle condition information relating to a road segment the vehicle is traversing, the road segment forming at least a portion of a road network;
      determine a routing path over the road segment responsive to at least one of the road condition information and the obstacle condition information;
      present the routing path in an augmented reality (AR) display field overlaid on the road segment visible through the vehicle's windshield, the routing path having one or more segments that are each displayed with variable visible characteristics based on at least one of the road condition information and the obstacle condition information relative to the road segment; and
      enable steering of the vehicle along the routing path on the road segment.

2. The apparatus as recited in claim 1, wherein the road condition information is determined responsive to at least one of the environmental data received from the collection agents in real-time and historical environmental data aggregated over a period of time for the environment.

3. The apparatus as recited in claim 1, wherein the obstacle condition information is determined responsive to at least one of the environmental data received from the collection agents in real-time and historical environmental data aggregated over a period of time for the environment.

4. The apparatus as recited in claim 1, wherein the environment comprises a geographic area including one or more road segments of the road network, and further wherein the environmental data comprises location data of the collection agents, motion data of vehicles respectively associated with the collection agents, and external data sensed by the sensors operating with the collection agents with respect to at least one of optical, infrared (IR), auditory, sonic, visual, aural, and thermal data pertaining to a vicinity respectively surrounding the vehicles disposed within the environment.

5. The apparatus as recited in claim 1, wherein the environmental data is utilized in generating or updating high definition (HD) mapping data associated with one or more road segments of the road network disposed in the environment.

6. The apparatus as recited in claim 1, wherein the one or more processors are operative to calibrate the vehicle to identify a vehicle type responsive to the vehicular condition data.

7. The apparatus as recited in claim 6, wherein the one or more processors are further operative to periodically recalibrate the vehicle responsive to determining that the at least one collection agent of the vehicle has sensed an anomalous condition.

8. The apparatus as recited in claim 1, wherein the vehicle is an autonomous vehicle, and wherein the one or more processors are operative to provide a steering control input to a vehicle control unit of the autonomous vehicle responsive to the routing path.

9. The apparatus as recited in claim 1, wherein the routing path over the road segment is determined as a balance between time for traversing a particular road portion having one or more obstacles and a ride comfort condition estimated for negotiating the one or more obstacles while traversing the particular road portion.

10. The apparatus as recited in claim 1, wherein the routing path includes at least one segment that traverses an obstacle on the road segment and is displayed with a visible characteristic that is different than visible characteristics associated with remaining segments of the routing path.

11. A system for facilitating assisted driving in a vehicle based on geospatial sensing of an environment in which the vehicle is disposed, the system comprising:
   one or more processors; and
   one or more persistent memory modules having program instructions stored thereon which, when executed by the one or more processors perform following acts:
      receive environmental data from one or more collection agents, each operating with a plurality of sensors configured to sense data relating to the environment, wherein at least one collection agent is integrated with the vehicle for providing vehicular condition data and vehicular navigation data;

obtain road condition information and obstacle condition information relating to a road segment the vehicle is traversing, the road segment forming at least a portion of a road network;

determine a routing path over the road segment responsive to at least one of the road condition information and the obstacle condition information;

present the routing path in an augmented reality (AR) display field overlaid on the road segment visible through the vehicle's windshield, the routing path having one or more segments that are each displayed with variable visible characteristics based on at least one of the road condition information and the obstacle condition information relative to the road segment; and enable steering of the vehicle along the routing path on the road segment.

12. The system as recited in claim 11, wherein the road condition information is determined responsive to at least one of the environmental data received from the collection agents in real-time and historical environmental data aggregated over a period of time for the environment.

13. The system as recited in claim 11, wherein the obstacle condition information is determined responsive to at least one of the environmental data received from the collection agents in real-time and historical environmental data aggregated over a period of time for the environment.

14. The system as recited in claim 11, wherein the environment comprises a geographic area including one or more road segments of the road network, and further wherein the environmental data comprises location data of the collection agents, motion data of vehicles respectively associated with the collection agents, and external data sensed by the sensors operating with the collection agents with respect to at least one of optical, infrared (IR), auditory, sonic, visual, aural, and thermal data pertaining to a vicinity respectively surrounding the vehicles disposed within the environment.

15. The system as recited in claim 11, further comprising program instructions for utilizing the environmental data in generating or updating high definition (HD) mapping data associated with one or more road segments of the road network disposed in the environment.

16. The system as recited in claim 11, further comprising program instructions for calibrating the vehicle responsive to the vehicular condition data.

17. The system as recited in claim 16, further comprising program instructions for periodically recalibrating the vehicle responsive to determining that the at least one collection agent of the vehicle has sensed an anomalous condition.

18. The system as recited in claim 11, wherein the vehicle is an autonomous vehicle, and further comprising program instructions for providing a steering control input to a vehicle control unit of the autonomous vehicle responsive to the routing path.

19. The system as recited in claim 11, wherein the vehicular condition data comprises data from at least one of an adaptive cruise control (ACC) system, an anti-lock braking system (ABS), an automotive navigation system, a blind spot monitoring system, a collision avoidance system, a crosswind stabilization system, a driver monitoring system, a forward collision warning system, an intersection assistance system, a hill descent control system, a traction control system, a suspension system, an axle sensor system, a lane departure warning and lane change assistance system, a parking and obstacle detection system, a tire pressure monitoring system, a driving mode system, a traffic sign and image recognition system, and a turning assistance system of the vehicle.

20. The system as recited in claim 11, wherein the routing path over the road segment is determined as a balance between time for traversing a particular road portion having one or more obstacles and a ride comfort condition estimated for negotiating the one or more obstacles while traversing the particular road portion.

21. The system as recited in claim 11, wherein the routing path includes at least one segment that traverses an obstacle on the road segment and is displayed with a visible characteristic that is different than visible characteristics associated with remaining segments of the routing path.

22. A method for facilitating assisted driving in a vehicle based on geospatial sensing of an environment in which the vehicle is disposed, the method comprising:

receiving environmental data from one or more collection agents, each operating with a plurality of sensors configured to sense data relating to the environment, wherein at least one collection agent is associated with the vehicle for providing vehicular condition data and vehicular navigation data;

obtaining road condition information and obstacle condition information relating to a road segment the vehicle is traversing, the road segment forming at least a portion of a road network;

determining a routing path over the road segment responsive to at least one of the road condition information and the obstacle condition information;

presenting the routing path in an augmented reality (AR) display field overlaid on the road segment visible through the vehicle's windshield, the routing path having one or more segments that are each displayed with variable visible characteristics based on at least one of the road condition information and the obstacle condition information relative to the road segment; and enabling the vehicle to steer along the routing path on the road segment.

23. The method as recited in claim 22, wherein the routing path includes at least one segment that traverses an obstacle on the road segment and is displayed with a visible characteristic that is different than visible characteristics associated with remaining segments of the routing path.

24. The method as recited in claim 22, further comprising calibrating the vehicle to identify a vehicle type responsive to the vehicular condition data.

25. The method as recited in claim 24, further comprising periodically recalibrating the vehicle responsive to determining that the at least one collection agent of the vehicle has sensed an anomalous condition.

* * * * *